(12) United States Patent
Schiebout et al.

(10) Patent No.: US 12,251,888 B2
(45) Date of Patent: Mar. 18, 2025

(54) RECIPROCATING SEALER FOR WEB CONVERTERS

(71) Applicant: Delta Industrial Services, Inc., Minneapolis, MN (US)

(72) Inventors: David Schiebout, Brainerd, MN (US); Jeffrey T. Bruin, Anoka, MN (US)

(73) Assignee: Delta Industrial Services, Inc., Minneapolis, MN (US)

( * ) Notice: Subject to any disclaimer, the term of this patent is extended or adjusted under 35 U.S.C. 154(b) by 192 days.

(21) Appl. No.: 16/844,395

(22) Filed: Apr. 9, 2020

(65) Prior Publication Data
US 2020/0230894 A1    Jul. 23, 2020

Related U.S. Application Data

(60) Continuation of application No. 15/361,849, filed on Nov. 28, 2016, now Pat. No. 10,654,224, which is a
(Continued)

(51) Int. Cl.
*B29C 65/00* (2006.01)
*B29C 65/18* (2006.01)
(Continued)

(52) U.S. Cl.
CPC ............ *B29C 66/849* (2013.01); *B29C 65/18* (2013.01); *B29C 65/30* (2013.01); *B29C 65/305* (2013.01); *B29C 66/1122* (2013.01); *B29C 66/43* (2013.01); *B29C 66/433* (2013.01); *B29C 66/8167* (2013.01); *B29C 66/81811* (2013.01);
(Continued)

(58) Field of Classification Search
CPC ....... B29C 66/849; B29C 65/18; B29C 65/30; B29C 65/305; B29C 66/1122; B29C 66/43; B29C 66/433; B29C 66/8167; B29C 66/81811; B29C 66/8242; B29C 66/872; B29C 66/91212; B29C 66/9141; B29C 66/91421; B29C 66/9241; B29C 66/92615; B29C 66/93; B29C 66/932;
(Continued)

(56) References Cited

U.S. PATENT DOCUMENTS

| 2,698,046 A | 12/1954 | Arno |
| 3,797,368 A | 3/1974 | Martelli |

(Continued)

OTHER PUBLICATIONS

U.S. Appl. No. 11/609,597 7,497,065, filed Dec. 12, 2006, Reciprocating Sealer for Web Converters.
(Continued)

*Primary Examiner* — Sameh Tawfik
(74) *Attorney, Agent, or Firm* — Schwegman, Lundberg & Woessner, P.A.

(57) ABSTRACT

Various device embodiments perform a sealing operation on a moving web, and comprise, among other things a plate assembly with an air cylinder assembly. The air cylinder assembly comprises a mount, a back plate, at least one air cylinder positioned between the mount and the back plate. The first plate assembly further includes a linear servo motor for linearly moving the air cylinder assembly with respect to the first base, and a first tooling plate with a sealing surface area. The first tooling plate coupled to the back plate.

20 Claims, 22 Drawing Sheets

Related U.S. Application Data division of application No. 13/827,563, filed on Mar. 14, 2013, now Pat. No. 9,505,191, which is a continuation-in-part of application No. 13/454,475, filed on Apr. 24, 2012, now Pat. No. 8,458,993, which is a continuation of application No. 12/835,616, filed on Jul. 13, 2010, now Pat. No. 8,171,702, which is a division of application No. 12/356,161, filed on Jan. 20, 2009, now Pat. No. 7,775,018, which is a continuation of application No. 11/609,597, filed on Dec. 12, 2006, now Pat. No. 7,497,065.

(60) Provisional application No. 60/750,006, filed on Dec. 13, 2005.

(51) Int. Cl.
  *B29C 65/30* (2006.01)
  *B65B 51/30* (2006.01)
  *B65B 65/02* (2006.01)
  *B29L 31/00* (2006.01)

(52) U.S. Cl.
  CPC ...... *B29C 66/8242* (2013.01); *B29C 66/8246* (2013.01); *B29C 66/83543* (2013.01); *B29C 66/872* (2013.01); *B29C 66/91212* (2013.01); *B29C 66/91231* (2013.01); *B29C 66/9141* (2013.01); *B29C 66/91421* (2013.01); *B29C 66/9241* (2013.01); *B29C 66/92615* (2013.01); *B29C 66/92655* (2013.01); *B29C 66/93* (2013.01); *B29C 66/932* (2013.01); *B29C 66/934* (2013.01); *B29C 66/944* (2013.01); *B29C 66/961* (2013.01); *B65B 51/30* (2013.01); *B65B 65/02* (2013.01); *B29C 66/43121* (2013.01); *B29C 66/432* (2013.01); *B29L 2031/712* (2013.01)

(58) Field of Classification Search
  CPC . B29C 66/934; B29C 66/43121; B31B 51/30; B31B 65/02; B29L 2031/712
  USPC .......................................................... 53/450
  See application file for complete search history.

(56) References Cited

U.S. PATENT DOCUMENTS

| | | | |
|---|---|---|---|
| 4,274,554 A | 6/1981 | Malpas | |
| 4,563,862 A | 1/1986 | Mcelvy | |
| 4,663,917 A | 5/1987 | Taylor et al. | |
| 4,726,173 A | 2/1988 | Giatti | |
| 4,750,313 A * | 6/1988 | Kammler | B29C 66/83543 |
| | | | 53/552 |
| 5,063,727 A | 11/1991 | Patelli | |
| 5,080,747 A | 1/1992 | Veix | |
| 5,105,603 A | 4/1992 | Natterer | |
| 5,295,942 A | 3/1994 | Franklin | |
| 5,347,795 A | 9/1994 | Fukuda | |
| 5,603,801 A | 2/1997 | Defriese et al. | |
| 5,622,033 A | 4/1997 | Fukuda | |
| 5,753,067 A * | 5/1998 | Fukuda | B29C 66/8491 |
| | | | 53/374.6 |
| 5,775,065 A | 7/1998 | Tolson | |
| 5,803,888 A | 9/1998 | Severs et al. | |
| 5,848,517 A | 12/1998 | Yamamoto et al. | |
| 5,956,924 A | 9/1999 | Thieman | |
| 5,966,909 A * | 10/1999 | Kammler | B29C 66/4312 |
| | | | 53/550 |
| 6,088,994 A * | 7/2000 | Nakagawa | B29C 66/4312 |
| | | | 53/374.6 |
| 6,110,089 A | 8/2000 | Hatozaki et al. | |
| 6,138,442 A * | 10/2000 | Howard | B29C 66/8222 |
| | | | 53/551 |
| 6,178,726 B1 * | 1/2001 | Takigawa | B29C 66/93451 |
| | | | 53/374.6 |
| 6,272,815 B1 | 8/2001 | Todd et al. | |
| 6,309,487 B1 | 10/2001 | Herrin et al. | |
| 6,389,780 B1 | 5/2002 | Coomber et al. | |
| 6,427,422 B2 * | 8/2002 | Nakagawa | B65B 9/207 |
| | | | 53/437 |
| 6,452,354 B1 | 9/2002 | Ellsworth et al. | |
| 6,481,188 B1 * | 11/2002 | Graham | B29C 66/919 |
| | | | 53/374.5 |
| 6,727,815 B2 | 4/2004 | Ropke | |
| 6,761,016 B1 * | 7/2004 | Soleri | B29C 66/4322 |
| | | | 53/554 |
| 6,820,392 B2 * | 11/2004 | Helwig | B65B 51/306 |
| | | | 53/374.6 |
| 6,862,867 B2 | 3/2005 | Cady et al. | |
| 6,931,824 B2 | 8/2005 | Rogers | |
| 7,059,103 B2 * | 6/2006 | Ninomiya | B29C 66/8145 |
| | | | 156/308.2 |
| 7,117,777 B1 | 10/2006 | Wilkes | |
| 7,121,067 B1 | 10/2006 | Fukuda et al. | |
| 7,325,373 B2 * | 2/2008 | Boldrini | B29C 66/81422 |
| | | | 53/550 |
| 7,497,065 B2 | 3/2009 | Schiebout et al. | |
| 7,775,018 B2 | 8/2010 | Schiebout et al. | |
| 7,775,413 B2 * | 8/2010 | Oblak | B29C 66/8185 |
| | | | 228/110.1 |
| 7,828,192 B2 * | 11/2010 | Pochardt | B29C 66/91231 |
| | | | 228/110.1 |
| 8,171,702 B2 | 5/2012 | Schiebout et al. | |
| 8,458,993 B2 | 6/2013 | Schiebout et al. | |
| 8,943,782 B2 * | 2/2015 | Dax | B29C 66/83421 |
| | | | 53/550 |
| 9,505,191 B2 | 11/2016 | Schiebout et al. | |
| 9,828,129 B2 | 11/2017 | Geble | |
| 10,654,224 B2 | 5/2020 | Schiebout et al. | |
| 2001/0008064 A1 | 7/2001 | Todd et al. | |
| 2002/0072456 A1 | 6/2002 | Ichikawa | |
| 2006/0016154 A1 | 1/2006 | Rogers | |
| 2006/0096254 A1 | 5/2006 | Rogers | |
| 2007/0135285 A1 | 6/2007 | Schiebout et al. | |
| 2009/0124479 A1 | 5/2009 | Schiebout et al. | |
| 2010/0273621 A1 | 10/2010 | Schiebout et al. | |
| 2012/0204520 A1 | 8/2012 | Schiebout et al. | |
| 2013/0267399 A1 | 10/2013 | Schiebout et al. | |
| 2017/0072625 A1 | 3/2017 | Schiebout et al. | |

OTHER PUBLICATIONS

U.S. Appl. No. 12/356,161 7,775,018, filed Jan. 20, 2009, Reciprocating Sealer for Web Converters.
U.S. Appl. No. 12/835,616 8,171,702, filed Jul. 13, 2010, Method for Performing a Sealing Operation on a Moving Web.
U.S. Appl. No. 13/454,475 8,458,993, filed Apr. 24, 2012, Reciprocating Sealer for Web Converters.
U.S. Appl. No. 13/827,563 9,505,191, filed Mar. 14, 2013, Reciprocating Sealer for Web Converters.
U.S. Appl. No. 15/361,849, filed Nov. 28, 2016, Reciprocating Sealer for Web Converters.
"U.S. Appl. No. 11/609,597, Final Office Action mailed Jul. 29, 2008", 9 pgs.
"U.S. Appl. No. 11/609,597, Non Final Office Action mailed Mar. 31, 2008", OARN, 9pgs.
"U.S. Appl. No. 11/609,597, Notice of Allowance mailed Oct. 17, 2008", 6 pgs.
"U.S. Appl. No. 11/609,597, Response filed Jan. 23, 2008 to Restriction Requirement mailed Jan. 8, 2008", 8 pgs.
"U.S. Appl. No. 11/609,597, Response filed Jun. 20, 2008 to Non Final Office Action mailed Mar. 31, 2008", 14 pgs.
"U.S. Appl. No. 11/609,597, Response filed Sep. 29, 2008 to Final Office Action mailed Jul. 29, 2008", 16 pgs.
"U.S. Appl. No. 11/609,597, Restriction Requirement mailed Jan. 8, 2008", 5 pgs.
"U.S. Appl. No. 12/356,161, 312 Amendment filed Apr. 20, 2010", 9 pgs.

(56) References Cited

OTHER PUBLICATIONS

"U.S. Appl. No. 12/356,161, Non-Final Office Action mailed Oct. 6, 2009", 12 pgs.
"U.S. Appl. No. 12/356,161, Notice of Allowance mailed Apr. 5, 2010", 6 pgs.
"U.S. Appl. No. 12/356,161, PTO Response to 312 Amendment mailed May 11, 2010", 2 pgs.
"U.S. Appl. No. 12/356,161, Response filed Jan. 6, 2010 to Non Final Office Action mailed Oct. 6, 2009", 15 pgs.
"U.S. Appl. No. 12/835,616, Corrected Notice of Allowance mailed Apr. 11, 2012", 2 pgs.
"U.S. Appl. No. 12/835,616, Non Final Office Action mailed Sep. 7, 2011", 8 pgs.
"U.S. Appl. No. 12/835,616, Notice of Allowance mailed Jan. 6, 2012", 7 pgs.
"U.S. Appl. No. 12/835,616, Response filed Dec. 7, 2011 to Non Final Office Action mailed Sep. 7, 2011", 15 pgs.
"U.S. Appl. No. 13/454,475, Final Office Action mailed Dec. 5, 2012", 5 pgs.
"U.S. Appl. No. 13/454,475, Non Final Office Action mailed Jun. 12, 2012", 7 pgs.
"U.S. Appl. No. 13/454,475, Notice of Allowance mailed Feb. 13, 2013", 7 pgs.
"U.S. Appl. No. 13/454,475, Response filed Jan. 30, 2013 to Final Office Action mailed Dec. 5, 2012", 9 pgs.
"U.S. Appl. No. 13/454,475, Response filed Oct. 11, 2012 to Non Final Office Action mailed Jun. 12, 2012", 12 pgs.
"U.S. Appl. No. 13/827,563, Non Final Office Action mailed Jan. 21, 2016", 7 pgs.
"U.S. Appl. No. 13/827,563, Notice of Allowance mailed Jul. 21, 2016", 7 pgs.
"U.S. Appl. No. 13/827,563, Response filed May 23, 2016 to Non Final Office Action mailed Jan. 21, 2016", 14 pgs.
"U.S. Appl. No. 13/827,563, Response filed Nov. 20, 2015 to Restriction Requirement mailed Sep. 21, 2015", 10 pgs.
"U.S. Appl. No. 13/827,563, Restriction Requirement mailed Sep. 21, 2015", 8 pgs.
"U.S. Appl. No. 15/361,849, Examiner Interview Summary mailed Dec. 16, 2019", 3 pgs.
"U.S. Appl. No. 15/361,849, Non Final Office Action mailed May 17, 2019", 7 pgs.
"U.S. Appl. No. 15/361,849, Non Final Office Action mailed Sep. 13, 2019", 8 pgs.
"U.S. Appl. No. 15/361,849, Notice of Allowance mailed Jan. 23, 2020", 9 pgs.
"U.S. Appl. No. 15/361,849, Response filed Apr. 15, 2019 to Restriction Requirement mailed Feb. 14, 2019", 8 pgs.
"U.S. Appl. No. 15/361,849, Response filed Aug. 19, 2019 to Non-Final Office Action mailed May 17, 2019", 15 pgs.
"U.S. Appl. No. 15/361,849, Response filed Dec. 12, 2019 to Non Final Office Action mailed Sep. 13, 2019", 12 pgs.
"U.S. Appl. No. 15/361,849, Restriction Requirement mailed Feb. 14, 2019", 6 pgs.

* cited by examiner

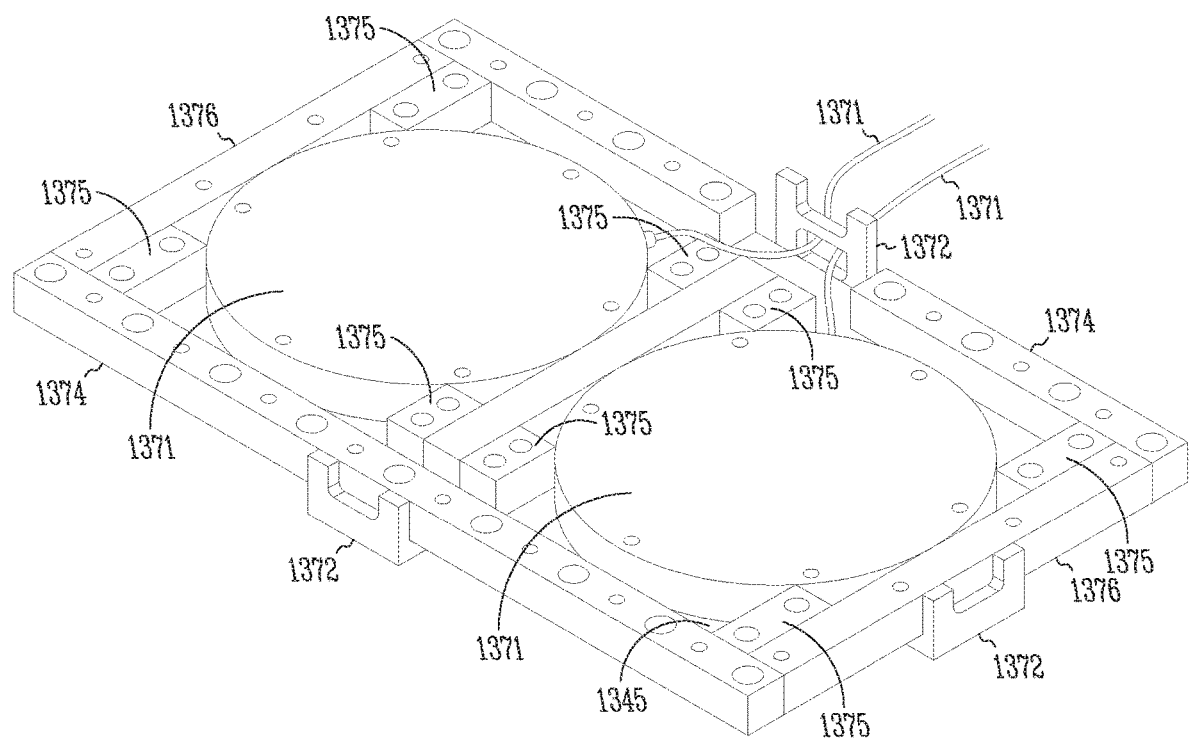
*FIG. 13*
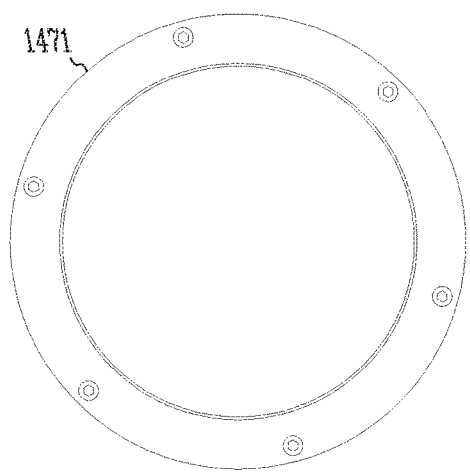 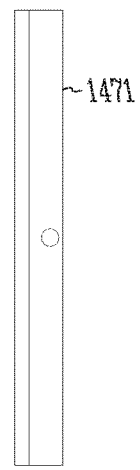
*FIG. 14A*  *FIG. 14B*

RECIPROCATING SEALER FOR WEB CONVERTERS

RELATED APPLICATIONS

This patent application is a continuation of U.S. patent application Ser. No. 15/361,849, filed Nov. 28, 2016, which is a divisional of U.S. patent application Ser. No. 13/827,563, filed Mar. 14, 2013, now issued as U.S. Pat. No. 9,505,191, which is a continuation-in-part of U.S. patent application Ser. No. 13/454,475, filed Apr. 24, 2012, now issued as U.S. Pat. No. 8,458,993, which is a continuation of U.S. patent application Ser. No. 12/835,616, filed Jul. 13, 2010, now issued as U.S. Pat. No. 8,171,702, which is a division of U.S. patent application Ser. No. 12/356,161, filed Jan. 20, 2009, now issued as U.S. Pat. No. 7,775,018, which is a continuation of U.S. patent application Ser. No. 11/609,597, filed Dec. 12, 2006, now issued as U.S. Pat. No. 7,497,065, which claims the benefit of priority, under 35 U.S.C. Section 119(e), to U.S. Provisional Patent Application Ser. No. 60/750,006, filed Dec. 13, 2005, which applications are all incorporated herein by reference in their entirety.

TECHNICAL FIELD

This application relates generally to sealers or packagers and, more particularly, to devices for sealing product processed by web converting equipment.

BACKGROUND

Traditional sealers for web converting equipment use a heated pattern roller. The ability of the roller to control the pressure and heat seal dwell time of the sealing operation is limited.

SUMMARY

Various device embodiments perform a sealing operation on a moving web, and comprise a first plate assembly a second plate assembly, and at least one plate assembly motor. The first plate assembly may comprise a first base, an air cylinder assembly connected to the first base, a linear servo motor for linearly moving the air cylinder assembly with respect to the first base, and a first tooling plate with a sealing surface area, the first tooling plate coupled to the back plate. The air cylinder assembly may comprise a mount having a periphery, a back plate, and two air cylinders positioned between the mount and the back plate. The mount may have two approximately equal air cylinder areas where one the air cylinders is approximately centered in one of the air cylinder areas and the other of the air cylinders is approximately centered in the other of the air cylinder areas. The second plate assembly may comprise a second base, a second tooling plate, and a linear servo motor for linearly moving the second tooling plate with respect to the second base. The at least one plate assembly motor may be operably linked to the first base and the second base to provide a linear motion of the first and second plate assemblies toward each other during the sealing operation on the moving web and away from each other after the sealing operation.

Various device embodiments comprise a first plate assembly including a first base, a first seal plate, and a first servo motor to provide a linear motion of the first seal plate with respect to the first base, and may further comprise a second plate assembly including a second base and a second seal plate, and a second servo motor to provide a linear motion of the second seal plate with respect to the second base. At least one plate assembly motor may be operably linked to the first base and the second base to provide a linear motion of the first and second plate assemblies toward each other to perform a sealing operation and away from each other. A controller may be connected to the at least one plate assembly motor and to the first and second servo motors to coordinate the motion of the first and second seal plates to perform the sealing operation on a web while traveling with the web. At least one tie arm may be connected to the first plate base and adapted to be influenced by a first eccentric cam. At least one tie arm may be connected to the second base and adapted to be influenced by a second eccentric cam. The plate assembly motor may be linked to the first and second eccentric cams using a drive shaft to rotate the first and second eccentric cams and provide the linear motion of the first and second plate assemblies toward each other to perform the sealing operation and away from each other. At least one of the first plate assembly or the second plate assembly may include at least one air cylinder to regulate a pressure of the seal operation.

Various method embodiments perform a sealing operation on a linearly moving web. The web moves along a linear web path passing between a first seal plate having a first seal area and a second seal plate, where the web has a width and the first seal area of the first seal plate having length in a direction in line with the web greater than the width of the web. A motion profile is implemented for the first seal plate and the second seal plate. The motion profile includes a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path. Implementing the motion profile includes maintaining the first and second seal plates substantially parallel to each other and to the linear web path when the first and second seal plates are moved into contact with the web. A desired pressure is applied between the first and second seal plates throughout the sealing operation. Applying a desired pressure includes using at least one air cylinder to distribute the desired pressure about the first seal area.

Various method embodiments perform a sealing operation on a linearly moving web. A desired seal time and a desired seal pressure are programmed for the sealing operation. The web is moved along a linear web path passing between a first seal plate having a first seal area and a second seal plate. The web has a width and the first seal area of the first seal plate having length in a direction in line with the web greater than the width of the web. A motion profile is implemented for the first seal plate and the second seal plate. The motion profile includes a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path. Implementing the motion profile may include maintaining the first and second seal plates substantially parallel to each other and to the linear web path when the first and second seal plates are moved into contact with the web. A desired pressure is applied between the first and second seal plates throughout the sealing operation. Applying a desired pressure may include using at least one air cylinder to distribute the desired pressure substantially equal about the first seal area.

Various method embodiments perform a sealing operation on a linearly moving web to create a pouch that contains a product. The web moves along a linear web path passing between a first seal plate having a first seal area and a second seal plate. The first seal area of the first seal plate is configured to provide sealed margins that define the pouch. A motion profile is implemented for the first seal plate and the second seal plate. The motion profile includes a first vector component in which the first and second seal plates are linearly moved substantially parallel with the linear web path at a velocity substantially equal to a velocity of the web, and a second vector component in which the first and second seal plates are moved into contact with the web to perform the sealing operation while the web moves along the linear web path. Implementing the motion profile includes maintaining the first and second seal plates substantially parallel to each other and to the linear web path when the first and second seal plates are moved into contact with the web. A desired pressure is applied, using at least one air cylinder, between the first and second seal plates throughout the sealing operation to provide the sealed margins that define the pouch.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 13 illustrates a perspective view of the plate assembly embodiment without a back plate.

FIGS. 14A-14B illustrate a bottom and side view of an embodiment of an air cylinder.

DETAILED DESCRIPTION

Figure 1A:
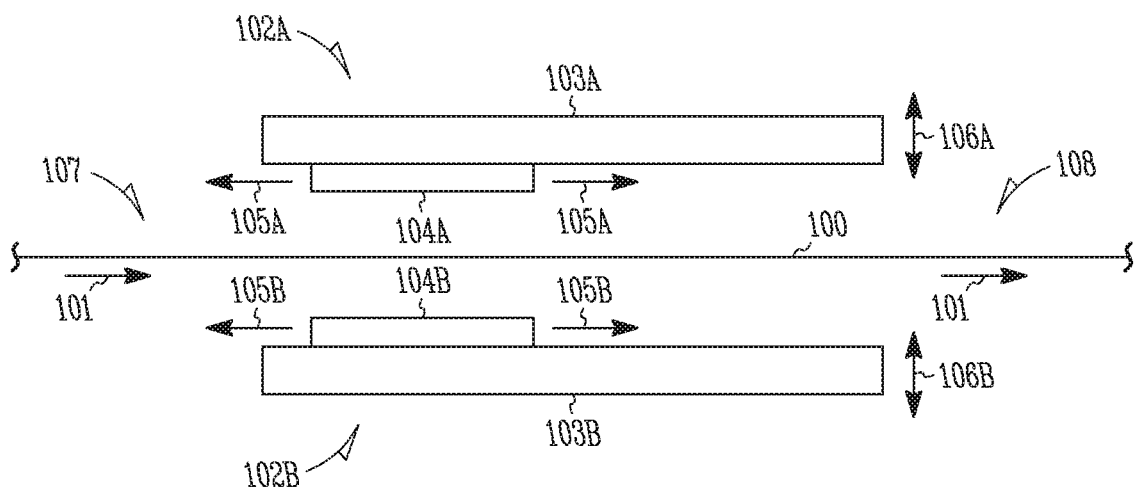
FIG. 1A-1C illustrate a reciprocating sealer for web converters, according to various embodiments of the present subject matter.
Figure 1B:
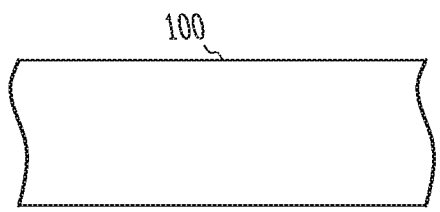
Figure 1C:
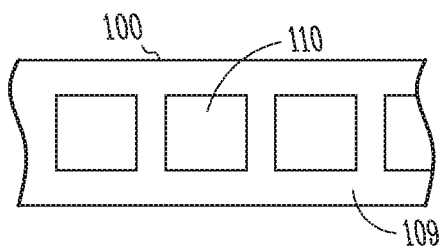

FIG. 1A-1C illustrate a reciprocating sealer for web converters, according to various embodiments of the present subject matter. FIG. 1A illustrates a web 100 traveling in a direction represented by arrows 101. Those of ordinary skill in the art will understand upon reading and comprehending this disclosure, how to use the reciprocating sealer with various web and product arrangements. The illustrated web can include product between a bottom web and a top web or can include a web folded longitudinally in the direction of web travel to provide the folded web with a bottom folded portion, a top folded portion and product therebetween. The system includes a first plate assembly 102A with a first base 103A, a first seal plate 104A, and a first linear servo motor to provide a linear motion of the first seal plate with respect to the first base, as illustrated by arrows 105A. A second plate assembly 102B includes a second base 103B a second seal plate 104B, and a second linear servo motor to provide a linear motion of the second seal plate with respect to the second base, as illustrated by arrows 105B. At least one plate assembly motor is operably linked to the first base 103A and the second base 103B to provide a linear motion, as illustrated by arrows 106A and 106B, of the first and second plate assemblies toward each other to perform a sealing operation and away from each other. The illustrated linear motion 106A-B of the first and second plate assemblies is substantially orthogonal to the linear motion 105A of the first seal plate with respect to the first base and the linear motion 105B of the second seal plate with respect to the second base. A controller is connected to the at least one plate assembly motor and to the first and second linear servo motors to coordinate the motion of the first and second seal plates to perform a seal operation on a web while traveling with the moving web. Thus, for example, the controller is able to control the velocity of the web and the horizontal velocity of the seal plates to match the seal plate velocities to the web velocity during a seal operation. In some embodiments, the controller receives a signal from a sensor or sensors, indicative of the web velocity, or receives a communication signal informing the controller of the web velocity. FIGS. 1B-1C illustrate the results of a sealing operation. The web 100 illustrated in FIG. 1B represents the web at 107, and the web 100 illustrated in FIG. 1C represents the web at 108. As illustrated in FIG. 1C, the sealed web 100 includes sealed margins 109 surrounding pouches 110 containing a product. The specific seal depends on the tooling used in the seal plates.

Figure 2:
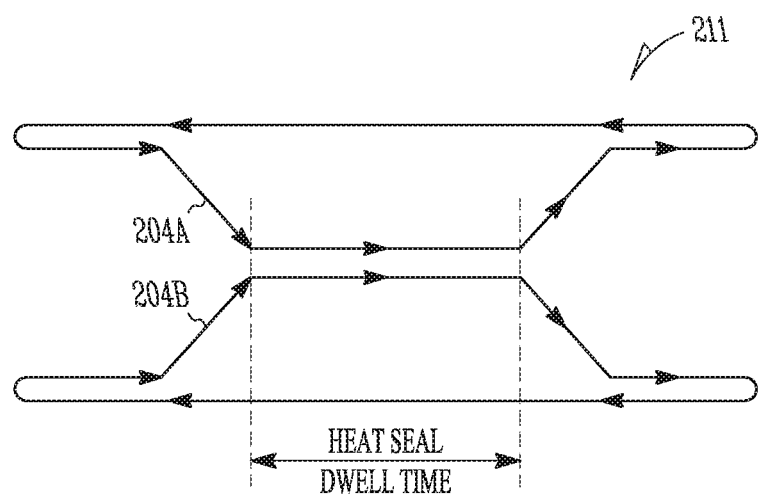
FIG. 2 illustrates an embodiment of a seal plate motion profile.

FIG. 2 illustrates an embodiment of a seal plate motion profile. The seal plates are illustrated as 104A and 104B in FIG. 1A, for example. The illustrated motion profile 211 can be implemented when the web is moving and passing between the plate assemblies. The profile 211 includes a motion profile 204A for the first or top plate assembly 104A, and a motion profile 204B for the second or bottom plate assembly 104B. In the illustrated example, as the plates move from left to right, the plates move into operational contact with the web to perform a sealing operation, as illustrated by the heat seal dwell time, and then move away from the web. The plates return, moving from right to left in the illustrated example, where the motion profile begins again. Thus, the profile illustrates a reciprocating motion. The profile may include parameters describing a dwell time, a closing ramp, an opening ramp, and a velocity. The dwell time dictates the amount of time the seal plates will remain engaged together to seal the web. The open and closing ramp parameters dictate the acceleration with which the controller will move the plate assembly servo motor to either open or close the seal plates. The velocity parameter dictates the maximum velocity at which the controller attempts to move the plate assembly servo motor when opening and closing the seal plates. The specifics of the profile, such as dwell time, the closing ramp, the opening ramp, the velocity, may be programmed into the controller.

Figure 3:
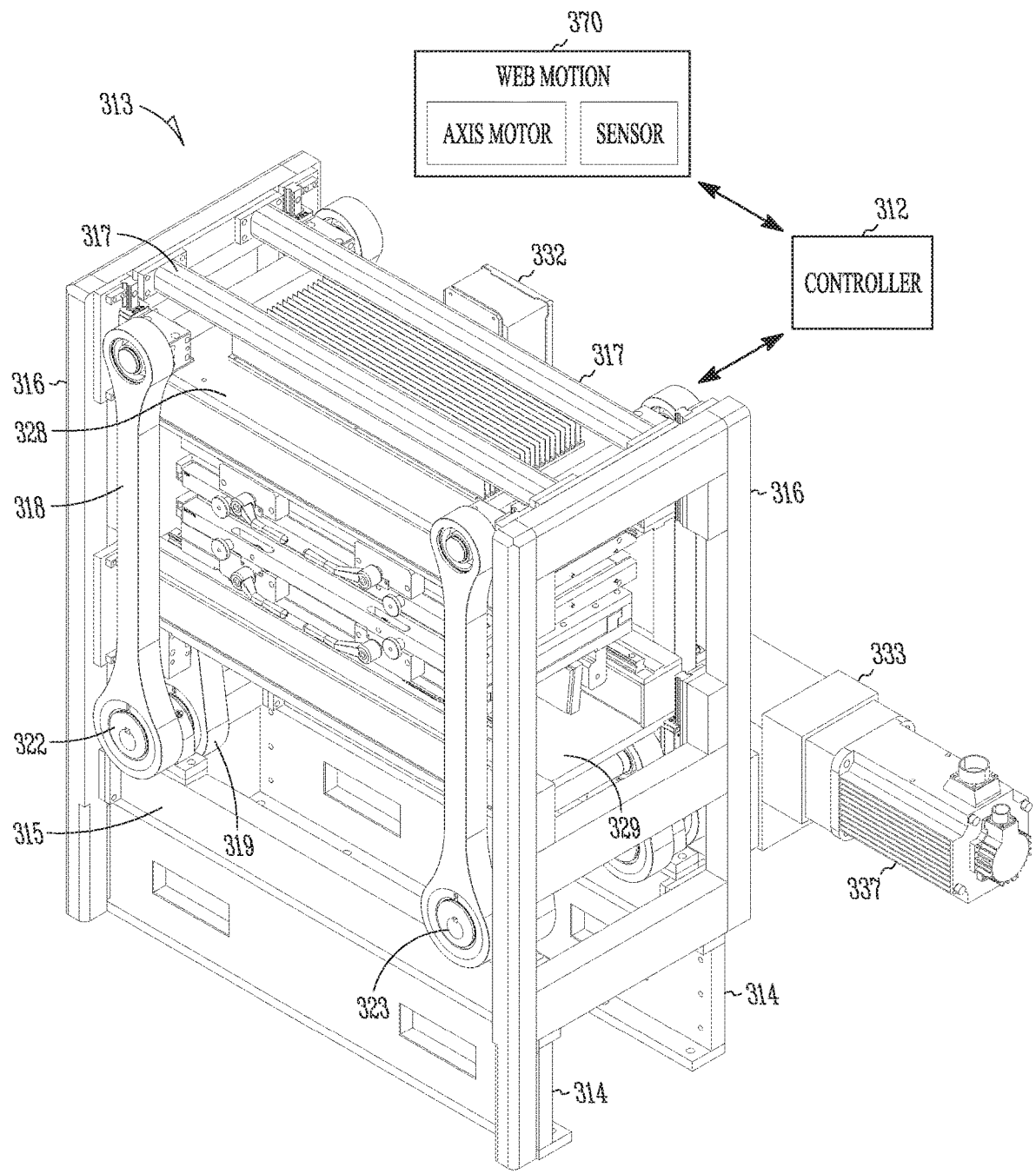
FIG. 3 illustrates a perspective view of a sealer embodiment.

FIG. 3 illustrates a perspective view of a sealer embodiment. A controller 312 is adapted to communicate with the sealer 313 to provide motion instructions to the motors, to provide heating instructions to the heating elements of the seal plate assemblies and to receive various feedback signals. The controller also monitors the motion of the web passing between the seal plates of the sealer to initiate and coordinate the sealer motion. In various embodiments, signals indicative of web motion 370 are received by the controller from either an axes integral to the controller, and providing the motion to move the web, or a sensor detecting the web motion, such as an encoder or a resolver. In the illustrated embodiment, visible components of the sealer 313 include support legs 314, lower tie bars 315, upper tie bars 317, and frame members 316. The illustrated embodiment also provides a view of some of the components that provide the clamping motion of the seal plates. These components include a plate assembly servo motor 337, mechanically coupled to a pair of shafts 323 through two gearboxes 333 (one gearbox is shown in the illustrated view). Each shaft is coupled to four tie arms, with two tie arms 318 coupled to the first seal plate assembly 328 and two tie arms 319 coupled to the second seal plate assembly 329. Each seal plate assembly is also mounted to the sealer frame through a plurality of linear bearings. Each tie arm is coupled to shaft 323 through an offset cam 322 and linkage such that when the shaft is rotated, the heat seal plates move apart in opposite directions.

Figure 4A:
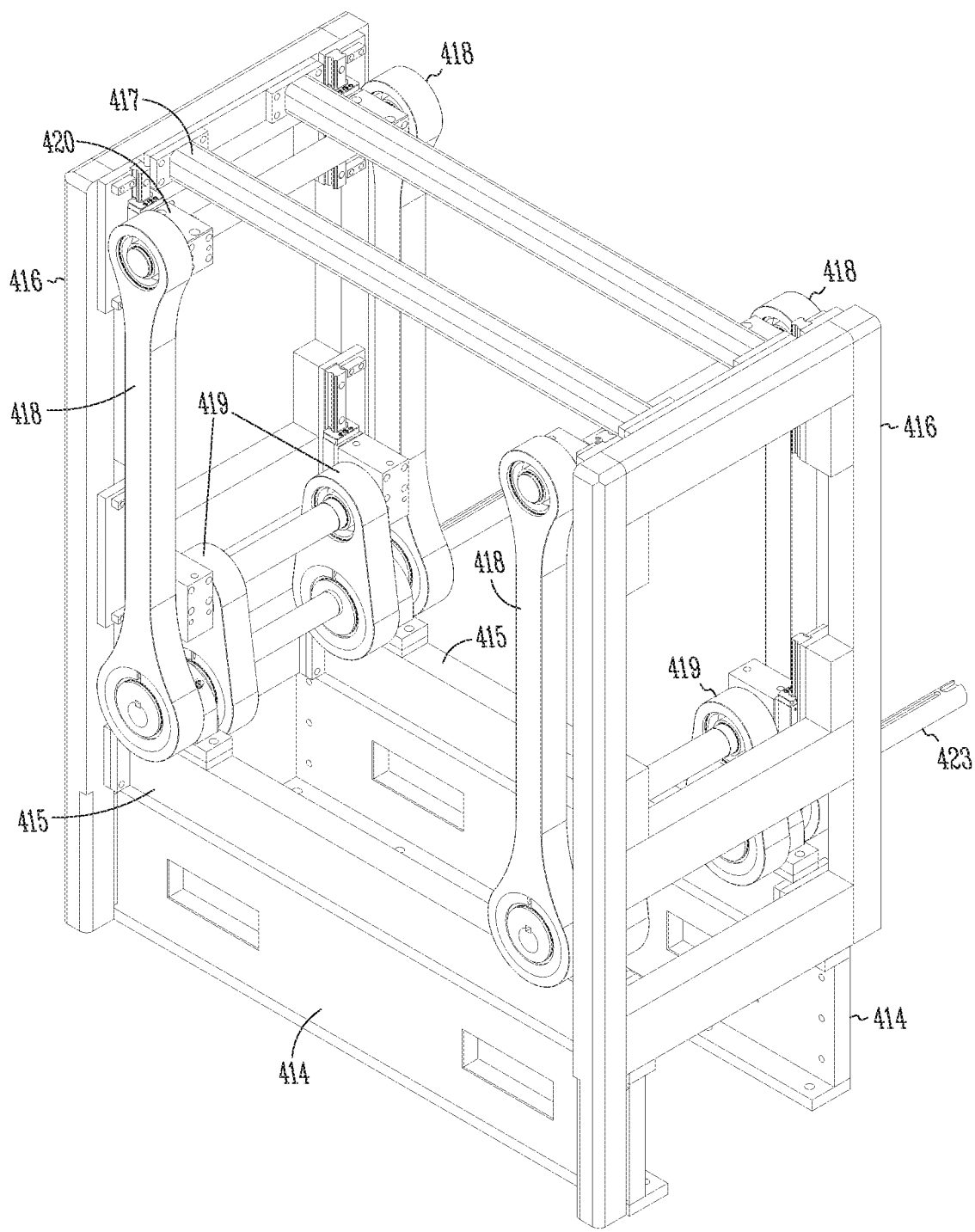
FIGS. 4A-4B illustrate a perspective view and an exploded view, respectively, of an embodiment of a sealer frame assembly.
Figure 4B:
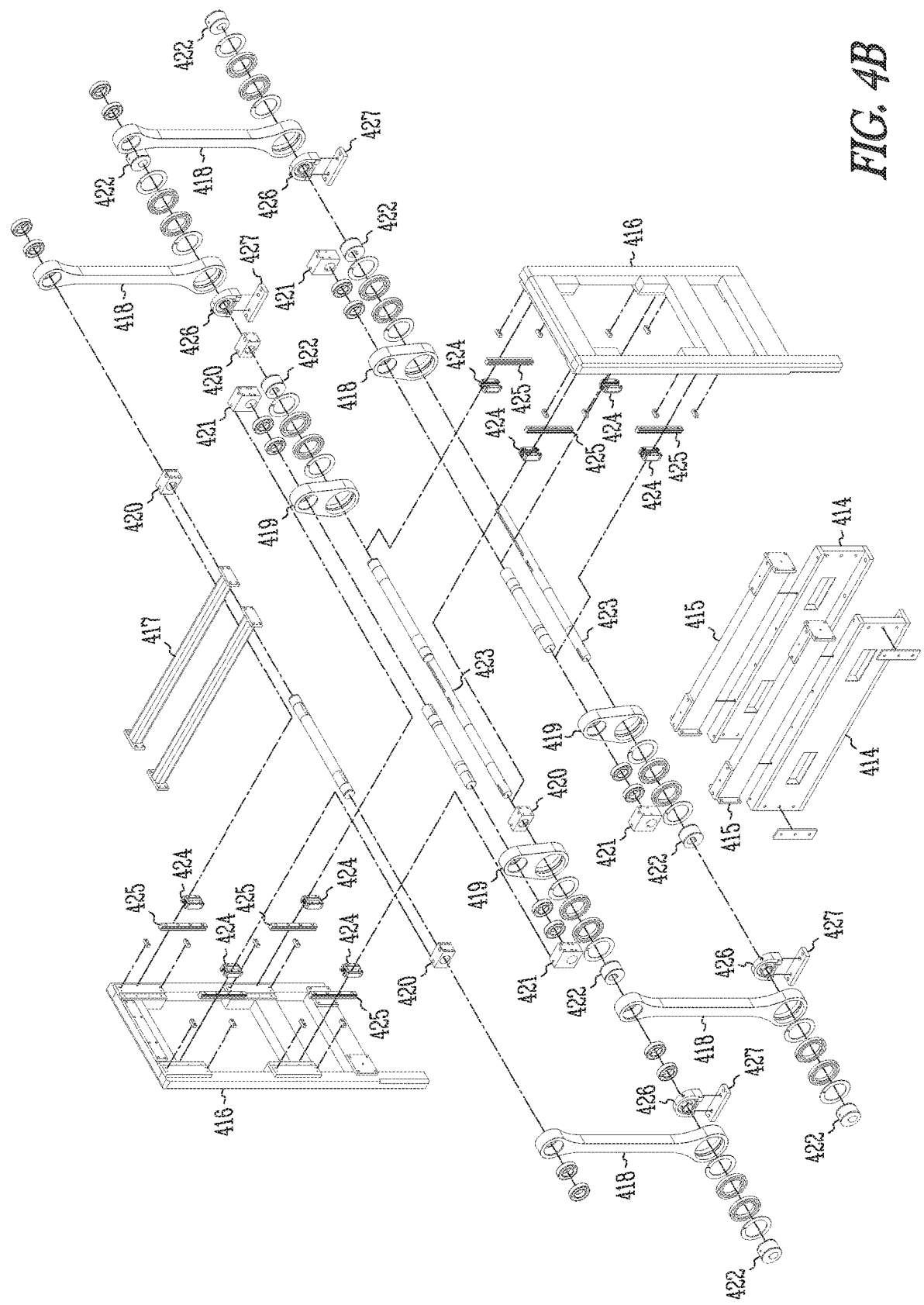

FIGS. 4A-4B illustrate a perspective view and an exploded view, respectively, of an embodiment of a sealer frame assembly. The illustrated frame assembly includes support legs 414. Lower tie bars 415 connect side frames 416 toward the bottom of the frames and are further connected to the support legs 414. Upper tie bars 417 connect side frames 416 toward the top of the frames. The illustrated assembly includes tie arms 419, which may be referred to herein as tie bars 419 to move the second plate via mounting block 421 and tie arms 418, which may be referred to herein as tie bars 418, to move the first plate assembly connected via mounting block 420. The tie bars 419 and tie bars 418 include apertures to receive eccentric cams 422, which are adapted to receive a drive shaft 423. The eccentric cams in tie bars 418 are 180 degrees out of phase with respect to the eccentric cams in tie bars 419 such that the first and second plate assemblies move in a complementary fashion (e.g. either moving simultaneously toward or simultaneously away from each other) when the drive shaft 423 is rotated. Those of ordinary skill in the art would understand upon reading and comprehending this disclosure that other mechanical linkages could be used to provide the complementary motion of the first and second seal plate assemblies. Various bearings and other hardware are illustrated to provide for a smooth operation of the linkage. Linear bearings 424 and linear bearing rails 425 are also illustrated. In the illustrated example, the rails 425 are attached to the frames 416, and the bearings 424 are attached to the mounting blocks 420 and 421 to provide a substantially vertical, linear path of motion for the first and second plate assemblies. The drive shaft 423 extends through pillow block ball bearings 426, which are attached to the tie bars 415 of the frame assembly via mount 427. Thus, the axis of the drive shaft is fixed, and the rotation of the eccentric cams 422 for the tie bars 418 and 419 causes the tie bars, and thus the upper and lower plates, to move with respect to the frame assembly.

Figure 5:
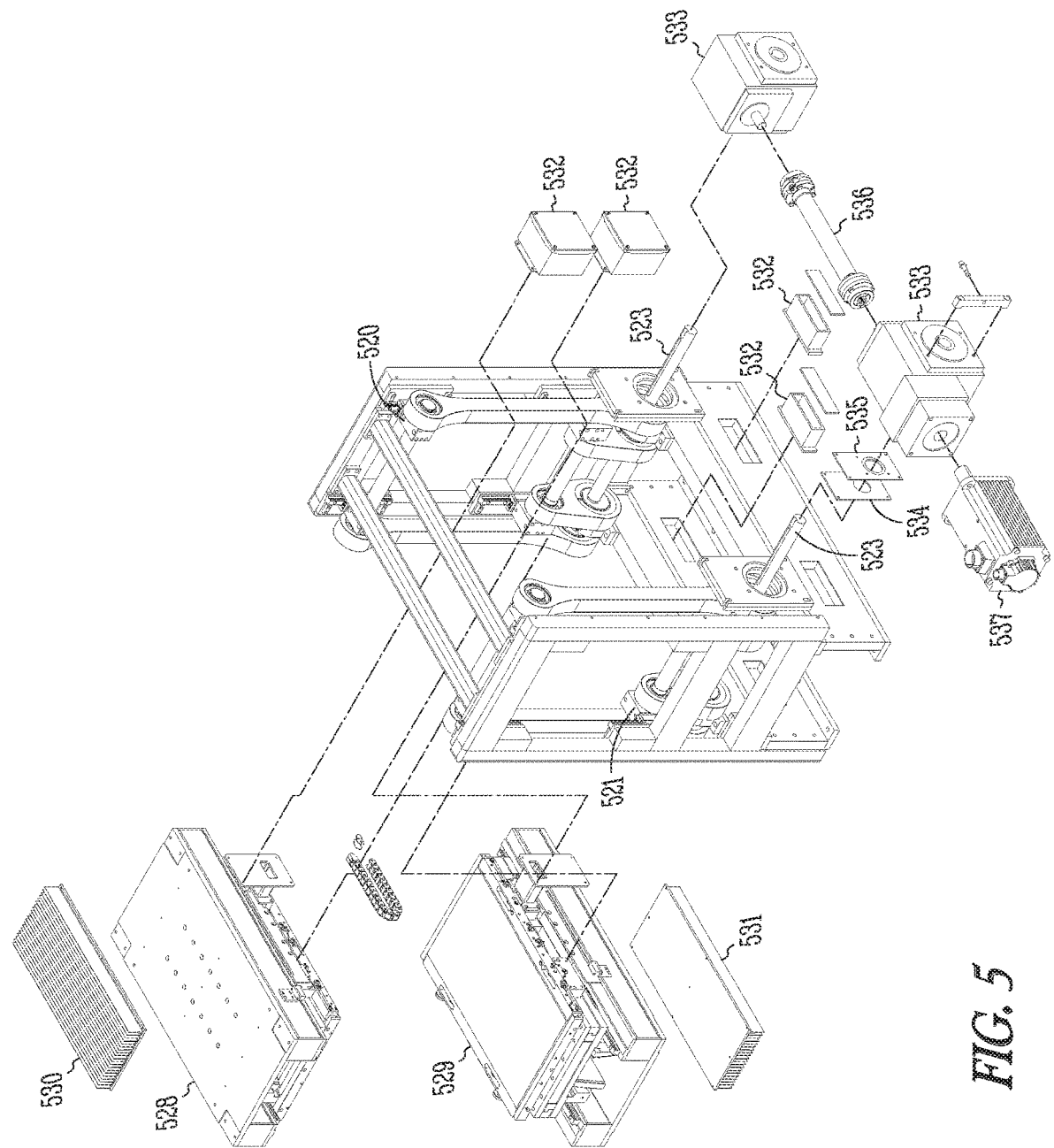
FIG. 5 illustrates an exploded view of a system embodiment, including the sealer frame assembly of FIG. 4A, first and second plate assemblies, and a plate assembly motor.

FIG. 5 illustrates an exploded view of a system embodiment, including the sealer frame assembly of FIG. 4A, first and second plate assemblies, and a plate assembly motor. Illustrated are a first seal plate assembly, or upper plate seal bed 528, and a second seal plate assembly, or lower plate seal bed 529. Also illustrated are an upper heat sink 530 attached to the upper plate seal bed 528 and a lower heat sink 531 attached to the lower plate seal bed 529. The seal beds 528 and 529 are linked to the tie bars using mounting blocks 520 and 521, respectively, also illustrated as 420 and 421 in FIG. 43. Electrical boxes 532 are provided for use in providing the control wiring to the seal beds. Reducer gear boxes 533 are connected to drive shafts 523. The gear boxes 533 are connected to the frame using an isolation pad 534 and a mounting plate 535. A floating coupling 536 links the gears boxes 533. A plate assembly servo motor 537 is connected to the gear boxes. Thus, the servo motor accurately rotates the drive shafts 523, which accurately moves the seal beds 528 and 529 through the eccentric cams. The plates can be moved through a large number of incremental positions between a maximum distance and minimum distance from each other. The maximum distance depends on the dimensions of the eccentric cam and other mechanical linkages.

Figure 6A:
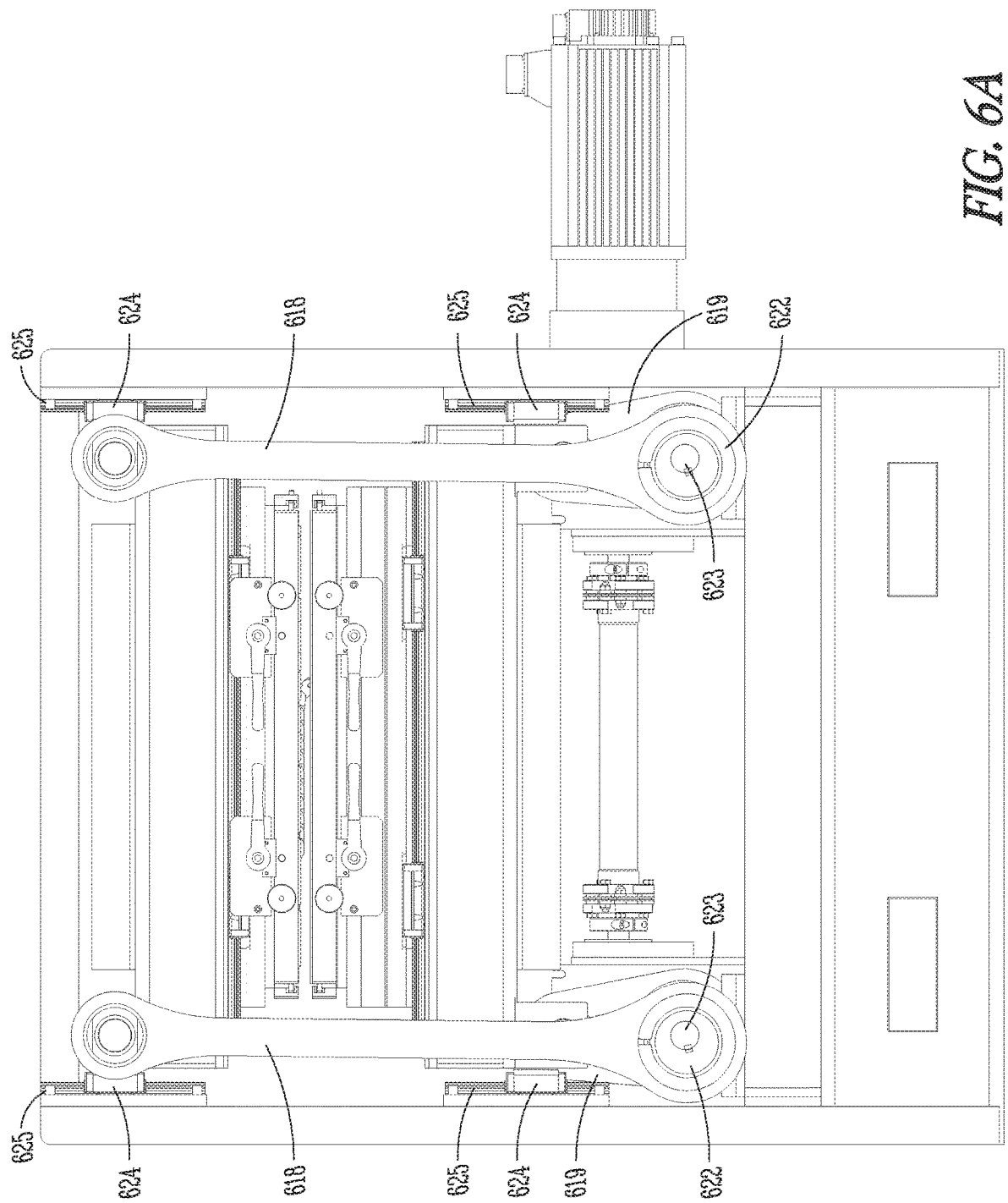
FIGS. 6A-6B illustrate a front view of a sealer embodiment in an open and close position, respectively.
Figure 6B:
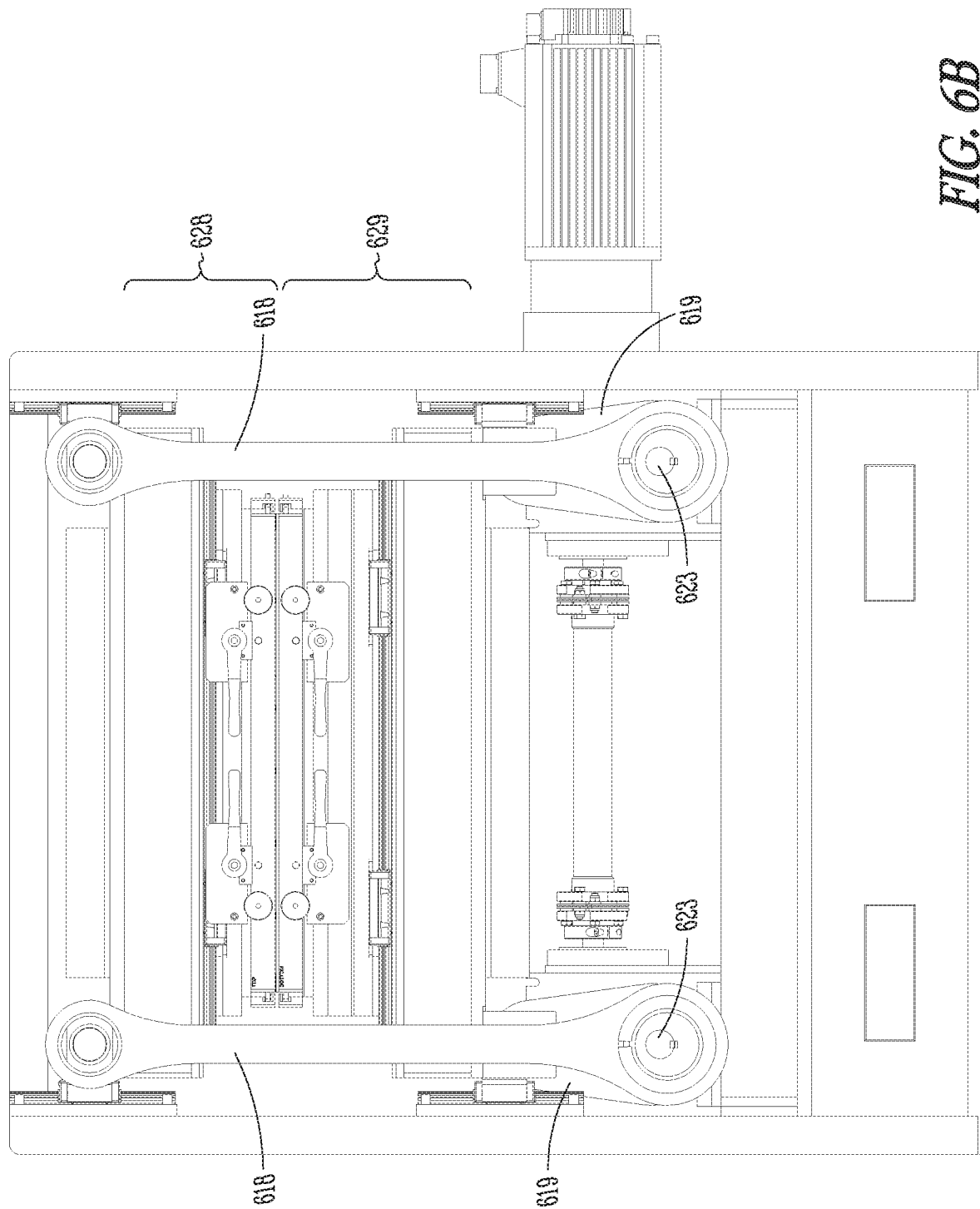

FIGS. 6A-6B illustrate a front view of a sealer embodiment in a partially open and a close position, respectively. The figure illustrates the tie bars 618 and 619, the drive shafts 623, and the eccentric cams 622 for tie bars 618. The eccentric cams for ties bars 618 are 180 degrees out of phase such that tie bars 618 move in a complementary fashion with respect to tie bars 619. The frame assembly is designed with symmetry to balance the complementary forces. The figure also illustrates the linear bearings 624 and rails 625 used to guide the vertical motion of the seal beds to provide the vertical motion in the motion profile illustrated in FIG. 2. In FIG. 6B, the drive shafts 623 are shown rotated about 45 degrees, from their position in FIG. 6A, to simultaneously raise the tie bars 619 and the second seal plate assembly 629, and lower the tie bars 618 and the first seal plate assembly 628.

Figure 7A:
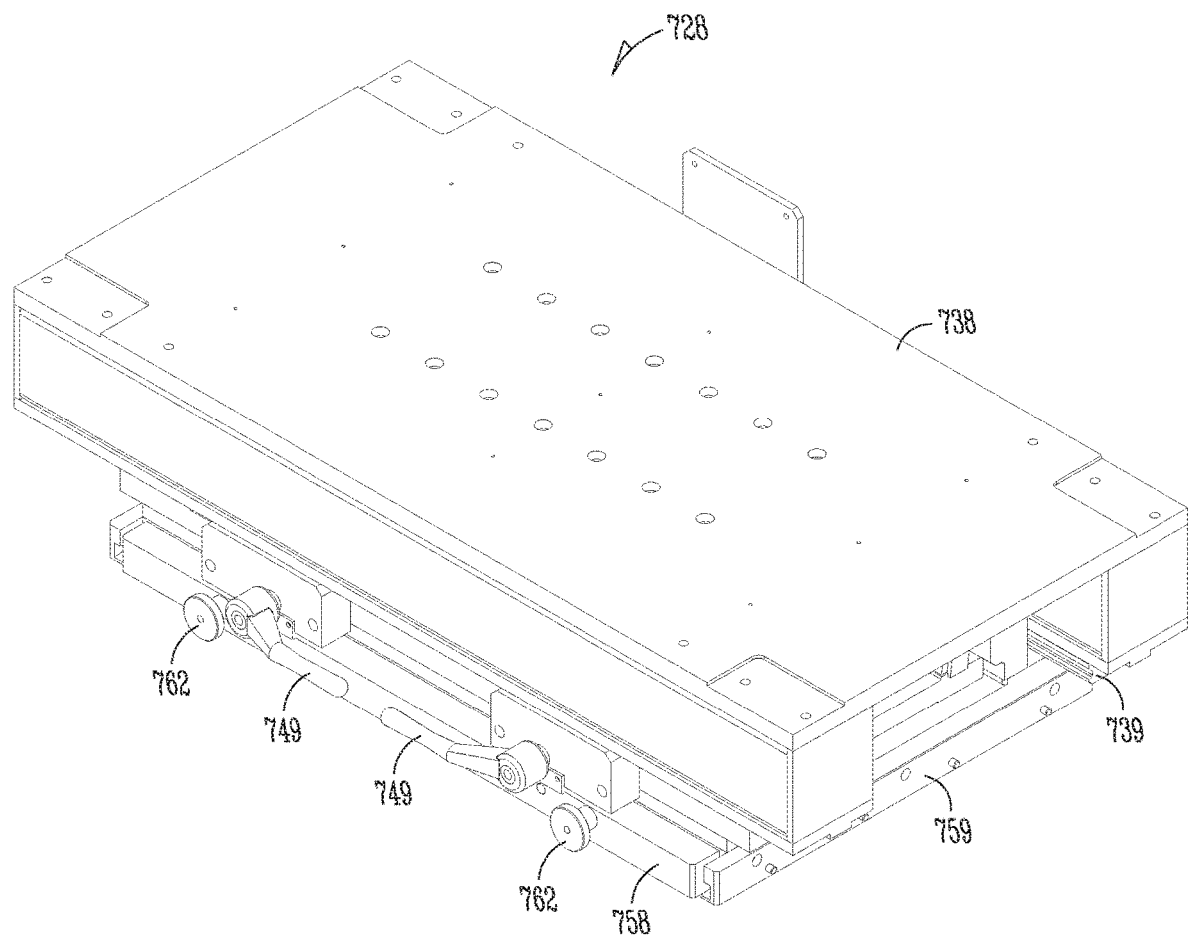
FIGS. 7A-7B illustrate perspective views and FIG. 7C illustrates an exploded view of an embodiment of a top seal plate assembly.
Figure 7B:
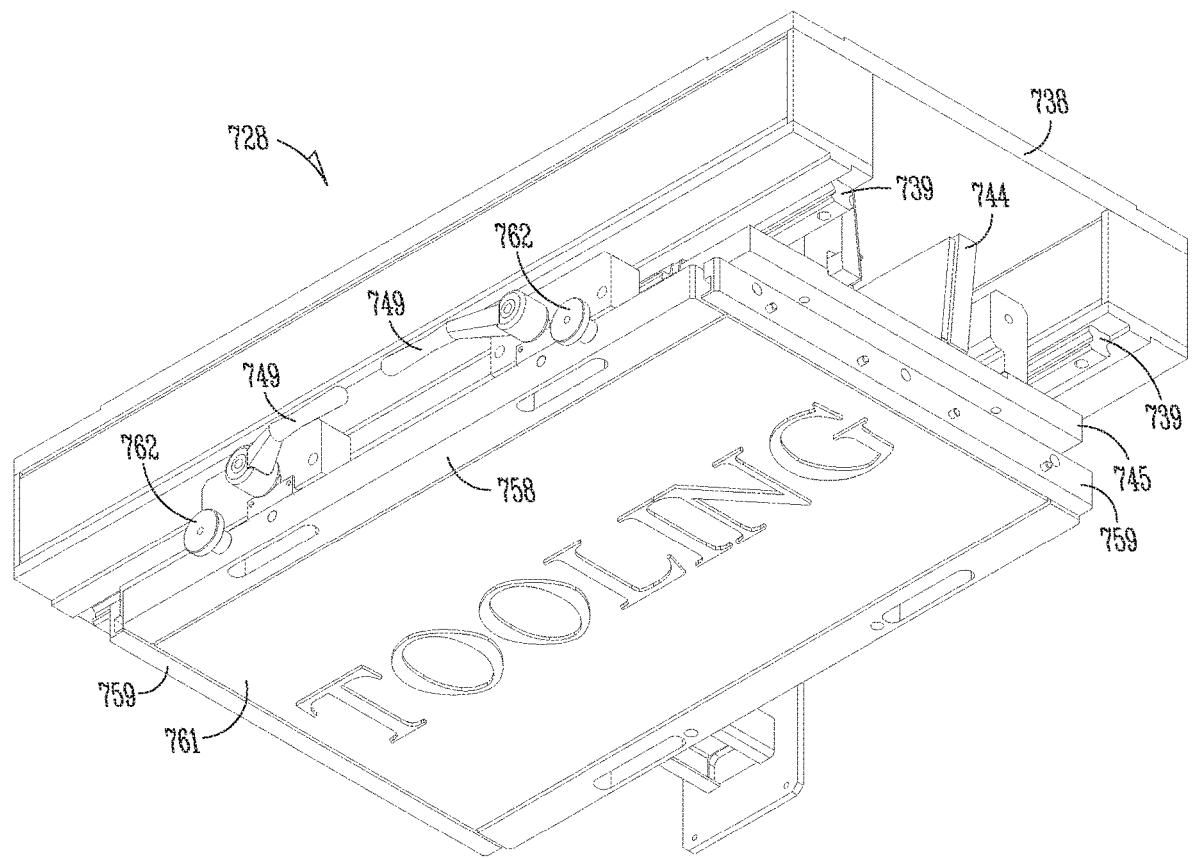
Figure 7C:
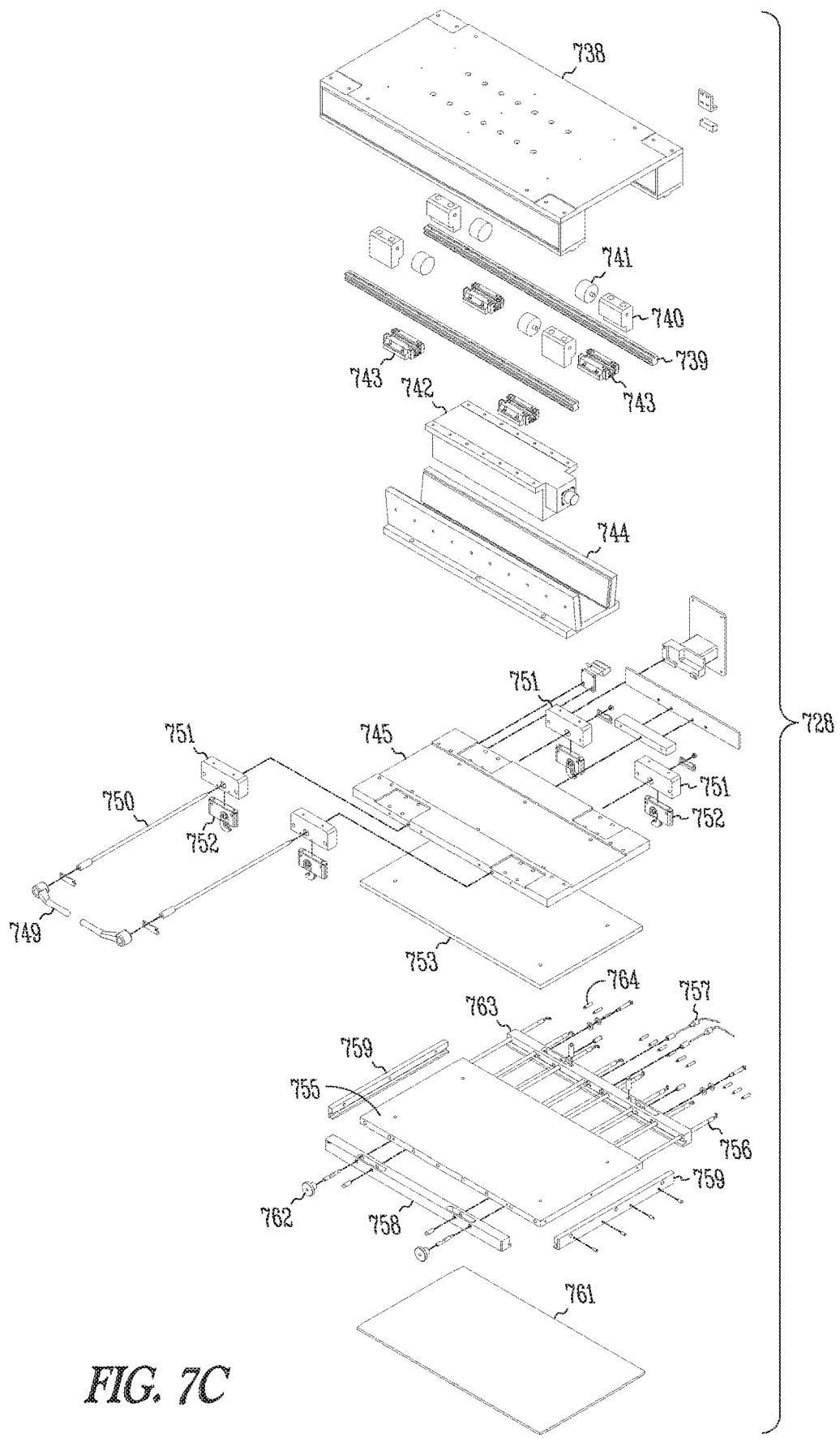

FIGS. 7A-7B illustrate perspective views and FIG. 7C illustrates an exploded view of an embodiment of a first seal plate assembly. The seal plate assembly includes a base 738. Linear bearing rails 739 are attached to the base, along with stop blocks 740 and bumpers 741 to limit the linear motion of a servo motor magnet 744. The linear bearing rails are included to support and guide the horizontal motion profile illustrated in FIG. 2. A linear servo motor 742 is attached to the base 738. Linear bearings 743 are attached, along with the linear servo motor magnet 744, to a magnet mount 745. The linear bearings 743 allow the servo motor magnet 744 and magnet mount to glide along the bearing rails 739. An isolation plate 753 is connected to the magnet mount 745. A heated plate 755, with inserted heater rods 756, is connected to the isolation plate. A thermocouple 757 is also illustrated, the heater rods 756 and the thermocouple 757 are electrically connected to the controller to facilitate a close looped heating system. A tooling plate 761 is held in place, next to the heated plate, between a pair of tooling guides 759 and is further secured with an operator side tooling clamp bar 758 and a machine side tooling clamp bar 763. Clamping handles 749, hex shaft 750, hold down clamps 752 and hold down clamp mounts 751 cooperate to secure the operator tooling clamp bar 758 and machine side tooling clamp bar 763. The operator side tooling clamp bar 758 is further secured with a pair of hand tightened bolts 762. The hand tightened bolts 762 extend through clearance holes in the operator side tooling clamp bar 758 and thread into the heated plate 755. In various embodiments, spring loaded detent pins 764, installed in the machine side tooling clamp bar 763, spring loading the tooling plate 761 in the cross web direction. The hand tighten bolts 762 secure the tooling plate 761, against the spring loaded detent pins 764. Further engagement of the tooling plate against the spring loaded detent pins 764 allow fine adjustment of the position and alignment of the tooling plate 761 with respect to the web.

Figure 8A:
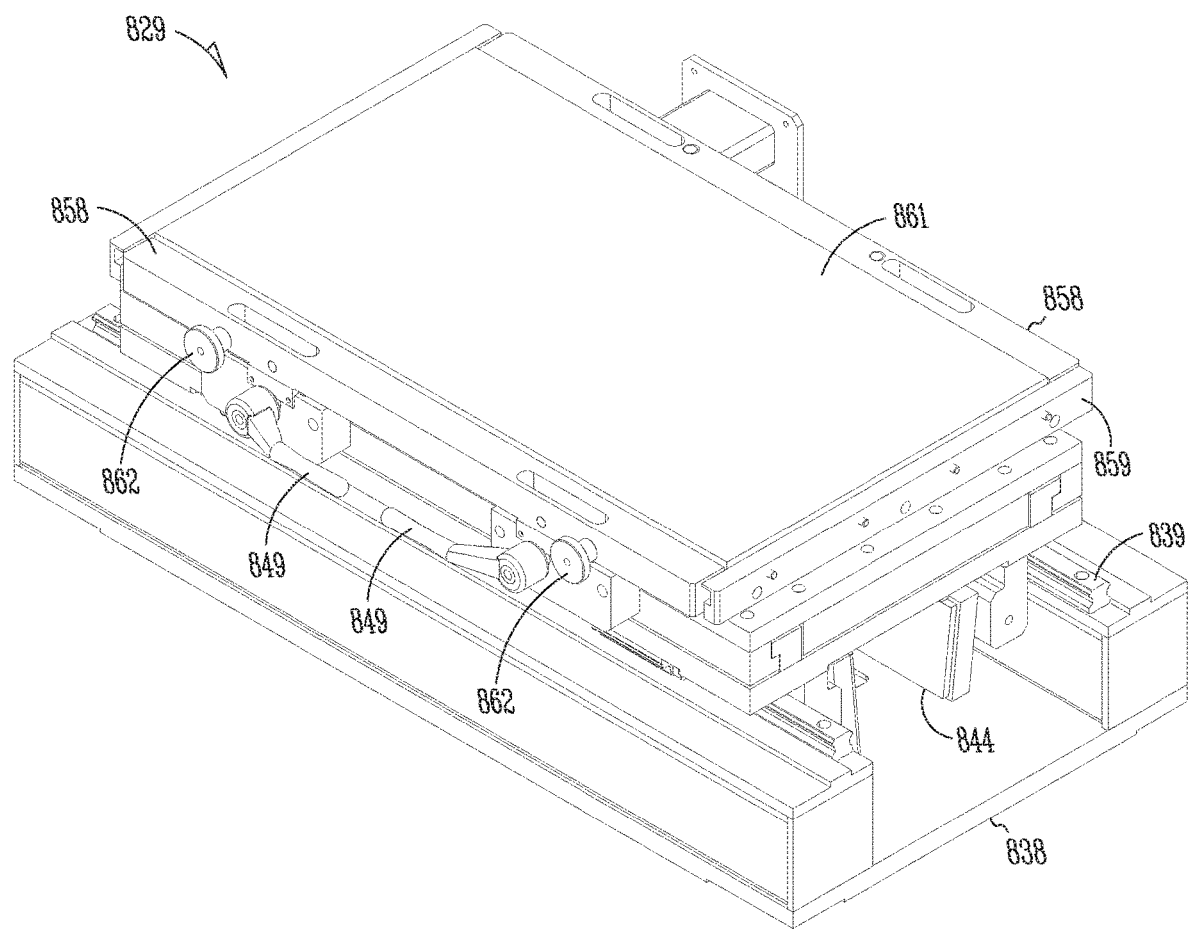
FIGS. 8A-8B illustrate a perspective and exploded view, respectively, of an embodiment of a bottom seal plate assembly.
Figure 8B:
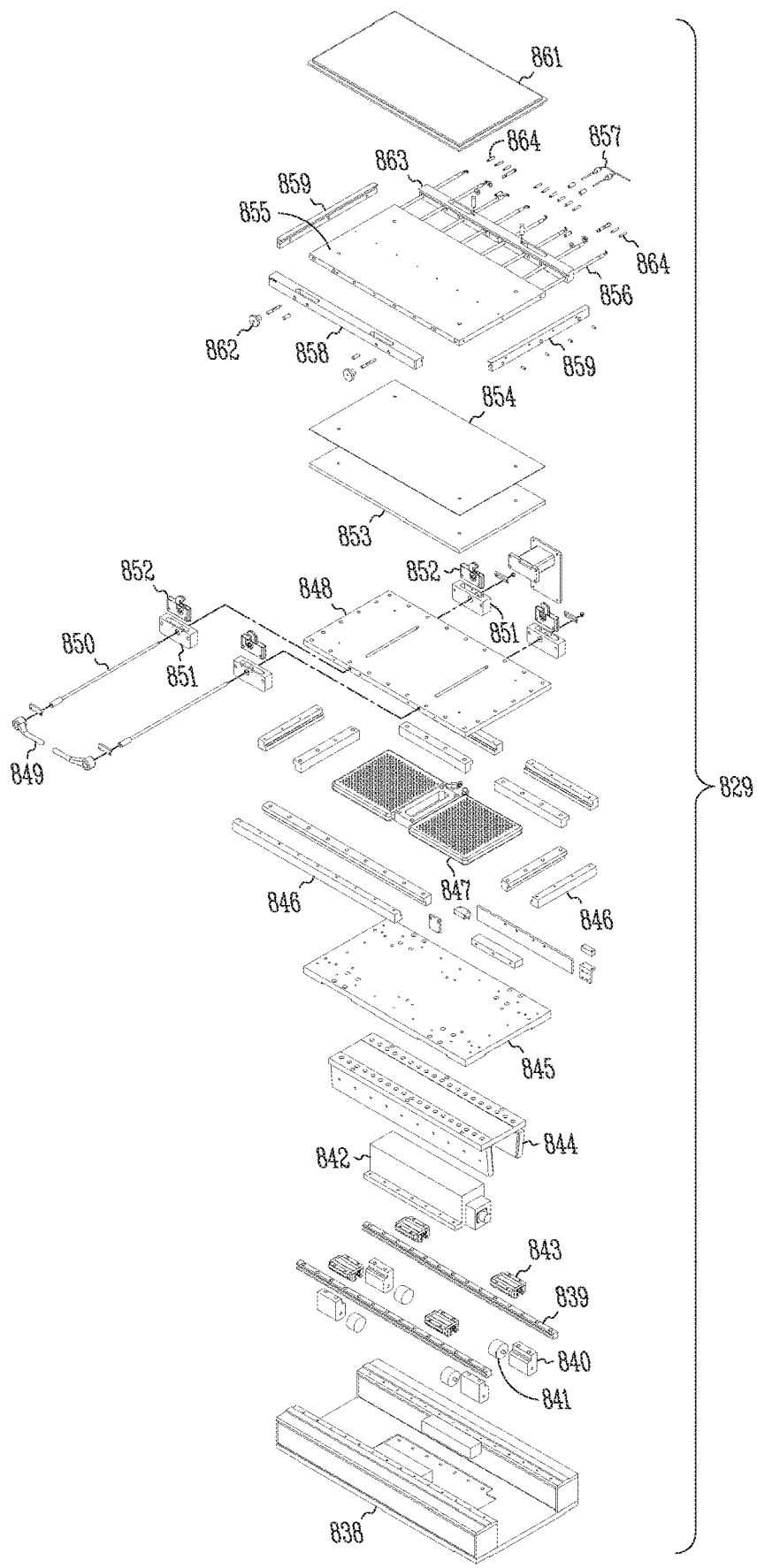

FIGS. 8A-8B illustrate a perspective and exploded view, respectively, of an embodiment of a second seal plate assembly. The seal plate assembly includes a base 838. Linear bearing rails 839 are attached to the base, along with stop blocks 840 and bumpers 841 to limit the linear motion of a servo motor magnet. A linear servo motor 842 is attached to the base 838. Linear bearings 843 are attached, along with the linear servo motor magnet 844, to a magnet mount 845. The linear bearings 843 allow the servo motor magnet 844 and magnet mount to glide along the bearing rails 839. Air bladder hard stops 846 are attached around a periphery of mount 845, and an air bladder 847 is positioned over the mount. An air bladder back plate 848 is attached to the hard stops 846. An isolation plate 853 and seal plate spacer 854 are positioned over the air bladder back plate 848. A heated plate 855, with heater rods 856, are positioned over the seal plate spacer. A thermocouple 857 is also illustrated, the heater rods 856 and the thermocouple 857 are electrically connected to the controller to facilitate a close looped heating system. A tooling plate 861 is held in place, next to the heated plate, between a pair of tooling guides 859 and is further secured with an operator side tooling clamp bar 858 and a machine side tooling clamp bar 863. Clamping handles 849, hex shaft 850, hold down clamps 852 and hold down clamp mounts 851, cooperate to secure the tooling clamp bar 858. The tooling clamp bar is further secured with a pair of hand tightened bolts 862. The hand tightened bolts 862 extend through clearance holes in the operator side tooling clamp bar 858 and thread into the heated plate 855. The tooling clamps 858 can be released and hand tightened bolts 862 and tooling clamp bar removed allowing the tooling plate 861 to be slid out between the tooling guides 859. In various embodiments, spring loaded detent pins 864, installed in the machine side tooling clamp bar 863, spring load the tooling plate 861 in the cross web direction. The hand tighten bolts 862 secure the tooling plate 861, against the spring loaded detent pins 864 via the operator side tooling clamp bar. Further engagement of the tooling plate 861 against the spring loaded detent pins 864 allow fine adjustment of the position and alignment of the tooling plate 861 with respect to the web.

In the illustrated embodiment, an air bladder, or bladders, are used to even pressure across the entire plate. Some embodiments provide an air bladder in the first or upper seal plate assembly, some embodiments provide an air bladder in the second or lower seal plate assembly, and some embodiments provide an air bladder in both the first and second seal plate assemblies. The illustrated embodiment provides the air bladder only for the bottom seal bed. The air bladder is filled, and rests on hard stops until the upper plate contacts the lower plate, pushing the lower seal plate off the hard stops. The seal pressure is controlled by the pressure of the bladder.

Figure 9A:
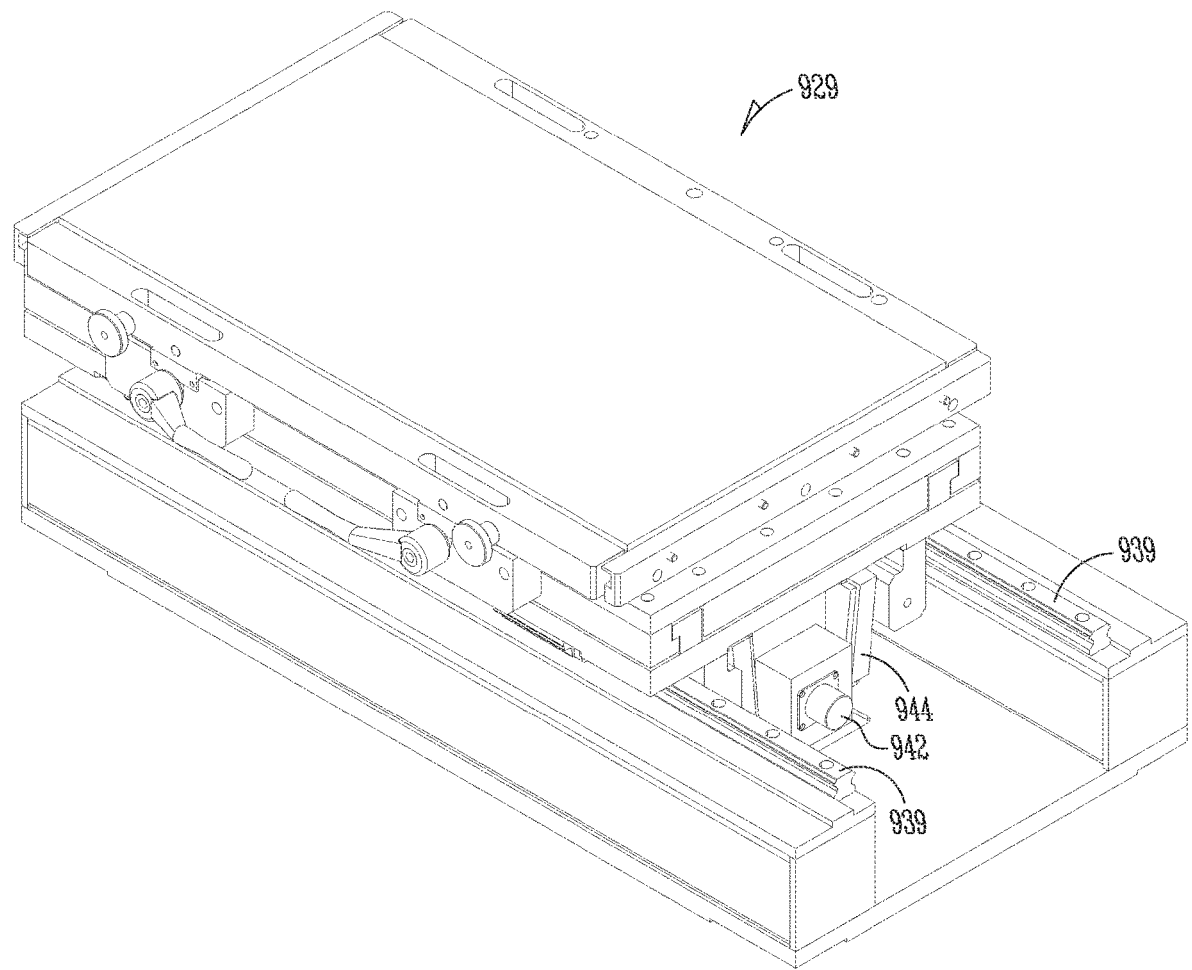
FIGS. 9A-9B illustrate linear motion of a seal plate using linear servo motors.
Figure 9B:
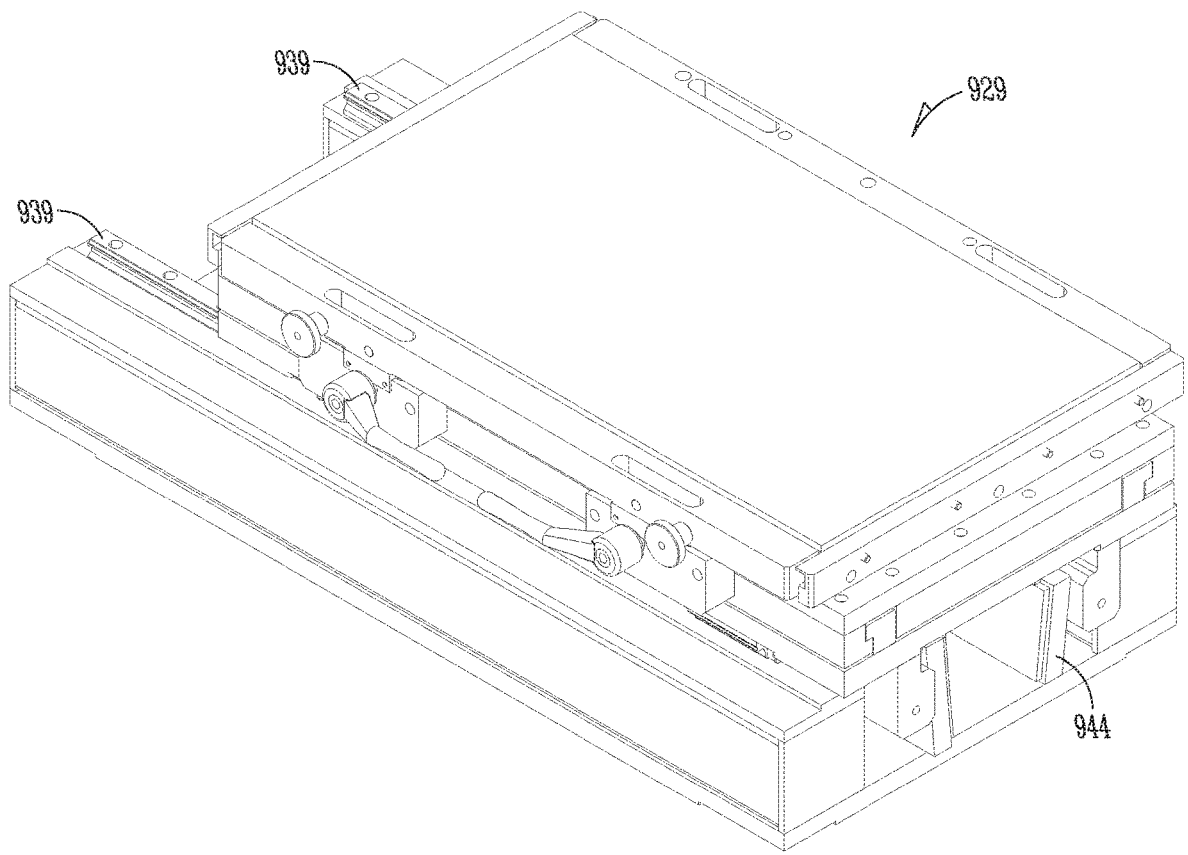

FIGS. 9A-9B illustrate linear motion of a seal plate assembly 929 using linear servo motors. The illustrated embodiment in FIG. 9A shows a seal plate assembly 929 where the seal plate is at or near one end of its linear travel range. In FIG. 9A, the linear motor 942 and a portion of the linear motor magnet 944 are visible. Also visible is a portion of the linear bearing rails 939. In FIG. 9B, the illustrated embodiment of the seal plate assembly of FIG. 9A is shown at or near the opposite end of its linear travel range. The linear motor 942 is no longer visible. FIGS. 9A-B generally show embodiments of the second seal plate assembly. The motion of embodiments of the first seal plate assembly operate on the same principles as that of the second seal plate assembly.

Figure 10:
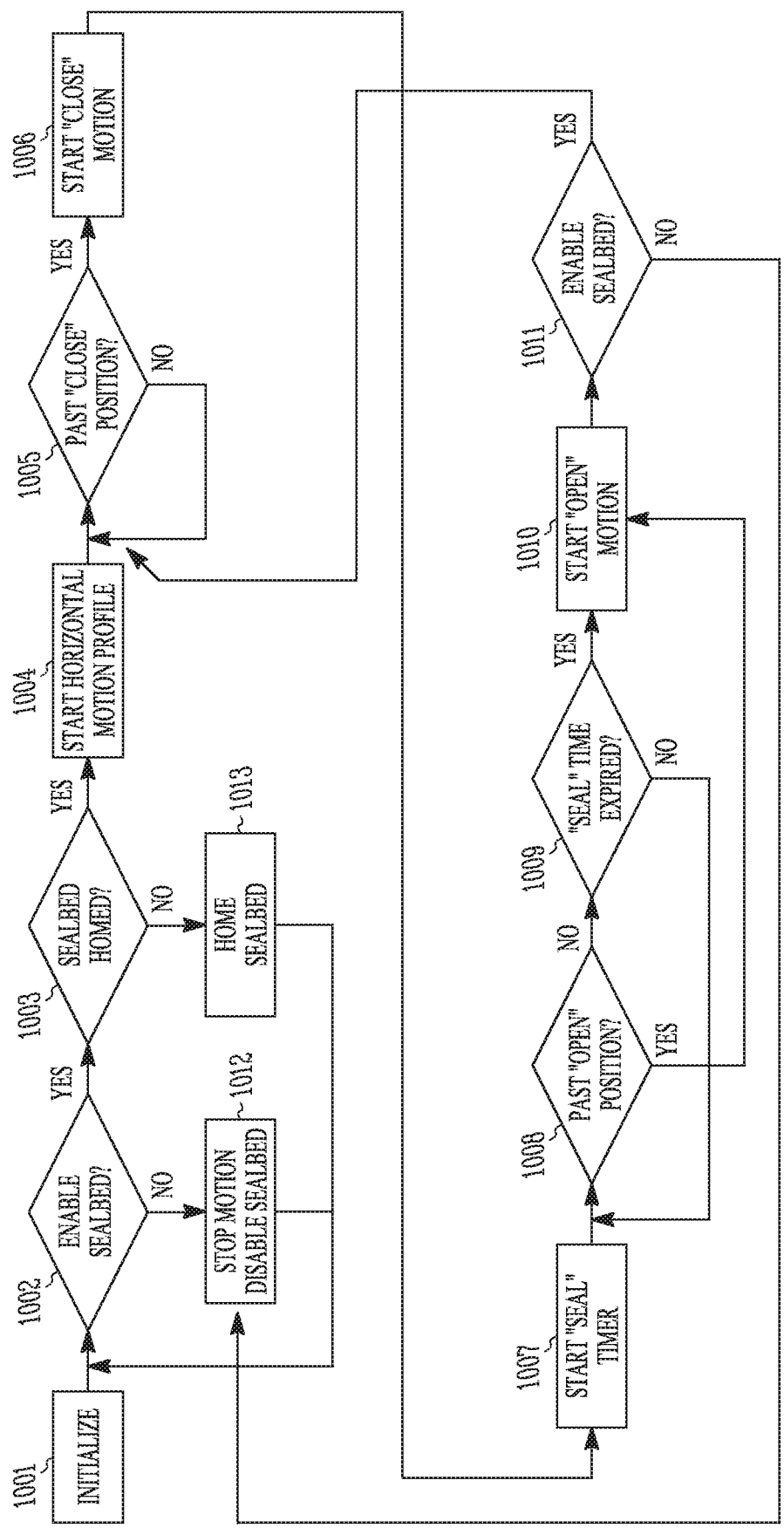
FIG. 10 illustrates a flow diagram for operating the sealer, according to various embodiments.

FIG. 10 illustrates a flow diagram for a process of operating the sealer, according to various embodiments. The process flow is controlled by logic programmed into the controller. Those of ordinary skill in the art will understand upon reading and comprehending this disclosure how the flow diagram corresponds to the motion profile illustrated in FIG. 2. The process begins when the sealer is initialized 1001. In various embodiments, initialization 1001 includes preheating the seal plates, setting and verifying the motion profiles for each of the servo motor axes, setting the seal air pressure, setting the seal dwell time and enabling or disabling the operation of the sealer or a portion thereof. After initialization 1001, the machine controller will monitor whether the sealer is enabled 1002. In various embodiments, if the sealer is not enabled, the machine controller will stop any linear motion of the sealer and move the plate assembly servo motor (337 in FIG. 3) to a position maximizing the distance between position of the seal plates assemblies 1012. If the sealer is enabled, the axes will need to be "homed" 1013 before the normal cyclical motion can take place. "Homing" 1013 allows the machine controller to reference the position of the servo axes with a physical location. In various embodiments, the physical reference is determined by moving each of the axes until the axis triggers a reference switch. The machine controller monitors the position of the axis when the reference switch is triggered. The machine controller in various embodiments, references subsequent motion from the position of the axis when it triggered the switch.

Once homed, the motion control monitors an axis indicative of the web motion, and initiates and coordinates the motion of the sealer with respect to the motion of the web. The first coordination task initiates a repeating process which controls the motion of the seal plate assemblies to accelerate and match the horizontal speed with the speed of the web 1004. The motion controller monitors the position of the seal assemblies. When the seal assemblies move past a "close" trigger position 1005, the machine controller will initiate and control the motion of the plate assembly servo motor to move the seal plates toward each other to clamp the web between the seal plates 1006. With the web clamped between the seal plates, the machine controller begins a seal dwell timer 1007. In various embodiments, the machine controller then monitors events to initiate opening the seal plates. In various embodiments, the termination of the seal dwell timer 1009 functions as the event to trigger opening of the seal plates. However, in various embodiments, if the seal dwell is set too long, the seal plates will open when the linear motors used to move the seal plates near the end of the linear travel, even if the seal time has not expired (i.e. seal time set too long or web moving too fast). As the linear motors approach the end of their travel, the task initiated in step 1004 stops the linear motors and moves them back to their initial position for the start another seal cycle. The sealer will continue to cycle until the sealer is disabled 1011.

Figure 11A:
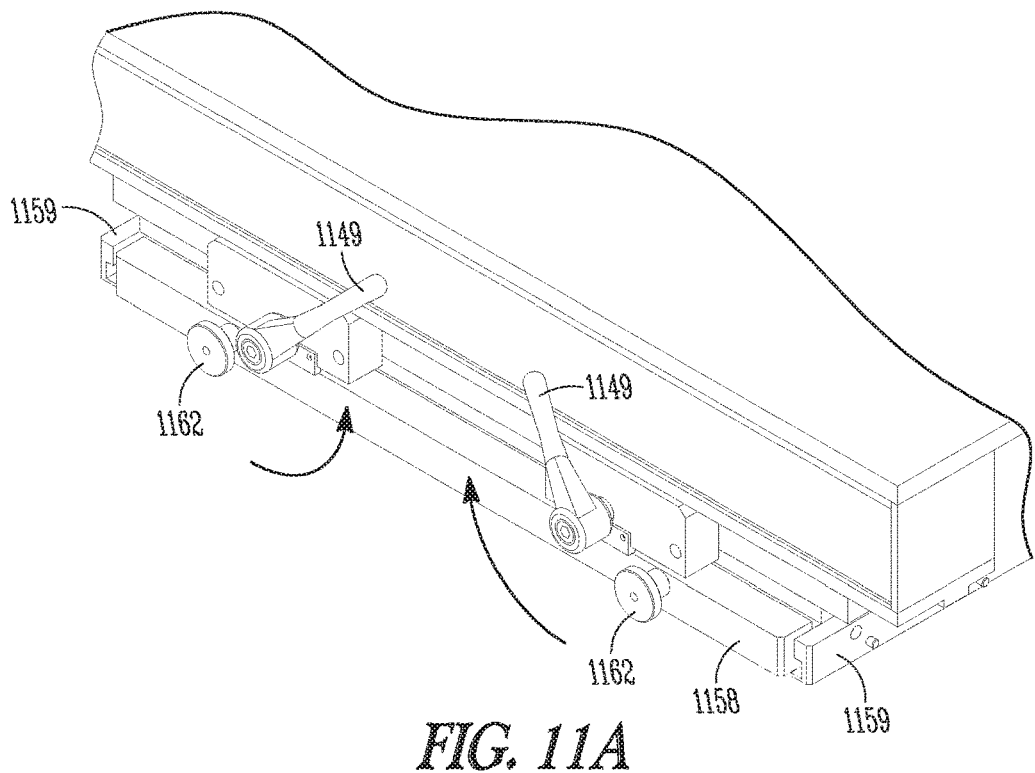
FIGS. 11A-11C illustrate a method of changing seal plate tooling according to various embodiments.
Figure 11B:
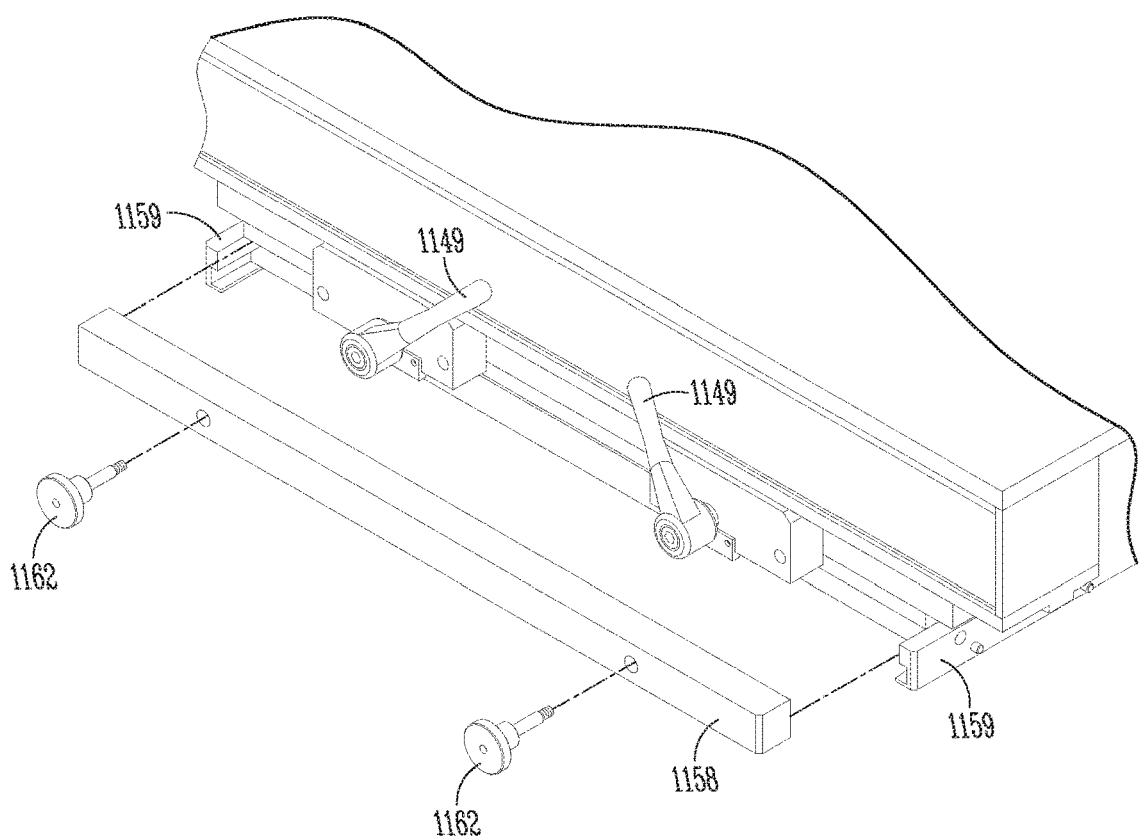
Figure 11C:
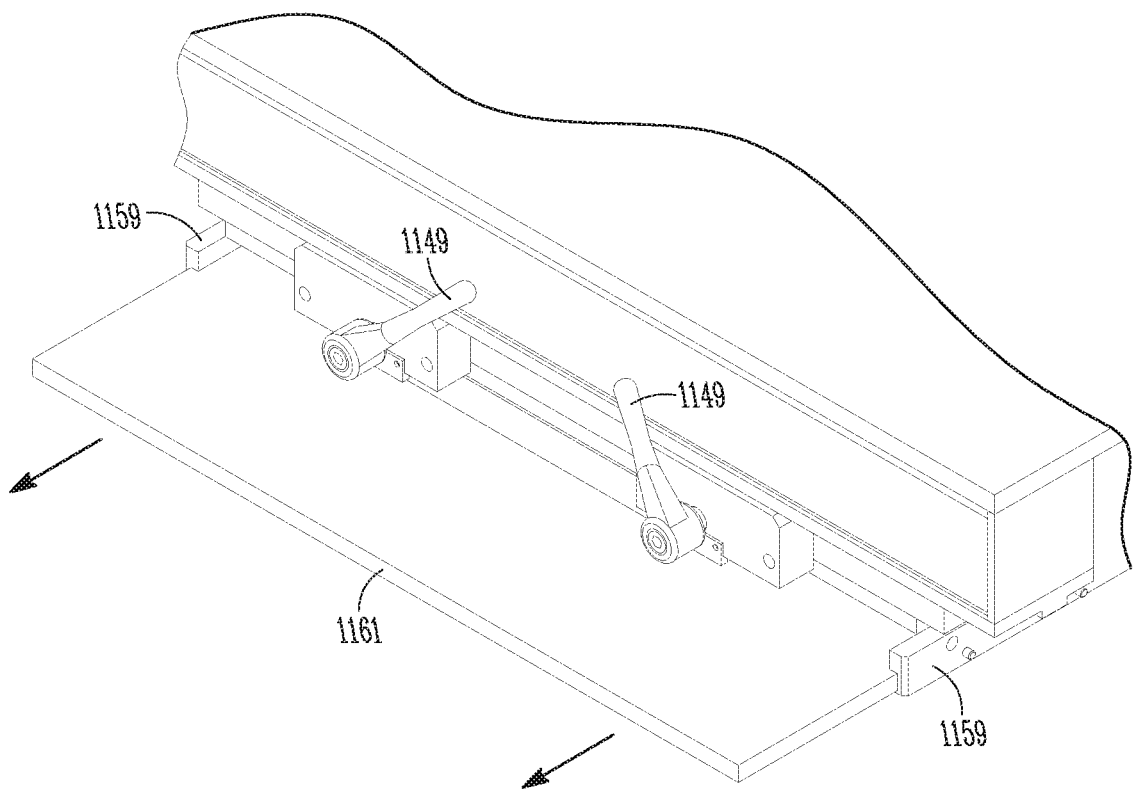

FIGS. 11A-11C illustrate a method of removing seal plate tooling according to various embodiments. FIG. 11A illustrates the operation of the clamping handles 1149 to release the tooling clamp bar 1158. FIG. 11B illustrates the removal of the tooling clamp bar 1158. The tooling clamp bar 1158 is removed after unthreading two bolts 1162 that are used to hold the tooling clamp bar near the heat plate. After removal of the tooling clamp bar, FIG. 11C illustrates the removal of the tooling plate 1161. The tooling plate 1161 is removed by sliding the plate out of the slots in tooling guides 1159. Installation of a tooling plate is achieved by repeating the process in the reverse order. The cam action clamps 1149 provide the ability to change upper and lower seal plates, regardless of whether the seal plates are cold or hot. The ability to change hot seal plates reduces changeover times, as operators do not have to wait for the tooling to cool.

The present subject matter is capable of sealing a web while the web is traveling. The present subject matter provides repeatable and consistent seal times for the seal operation. The servo driven motors provide multiple open positions. The sealer is able to accurately control the position of the seal beds, thus controlling the seal times.

Some embodiments, as discussed above, use one or more air bladders to distribute pressure across the plate and provide an even seal pressure. Some embodiments, as discussed below, use one or more air cylinders to distribute pressure across the plate and provide an even seal pressure.

Figure 12A:
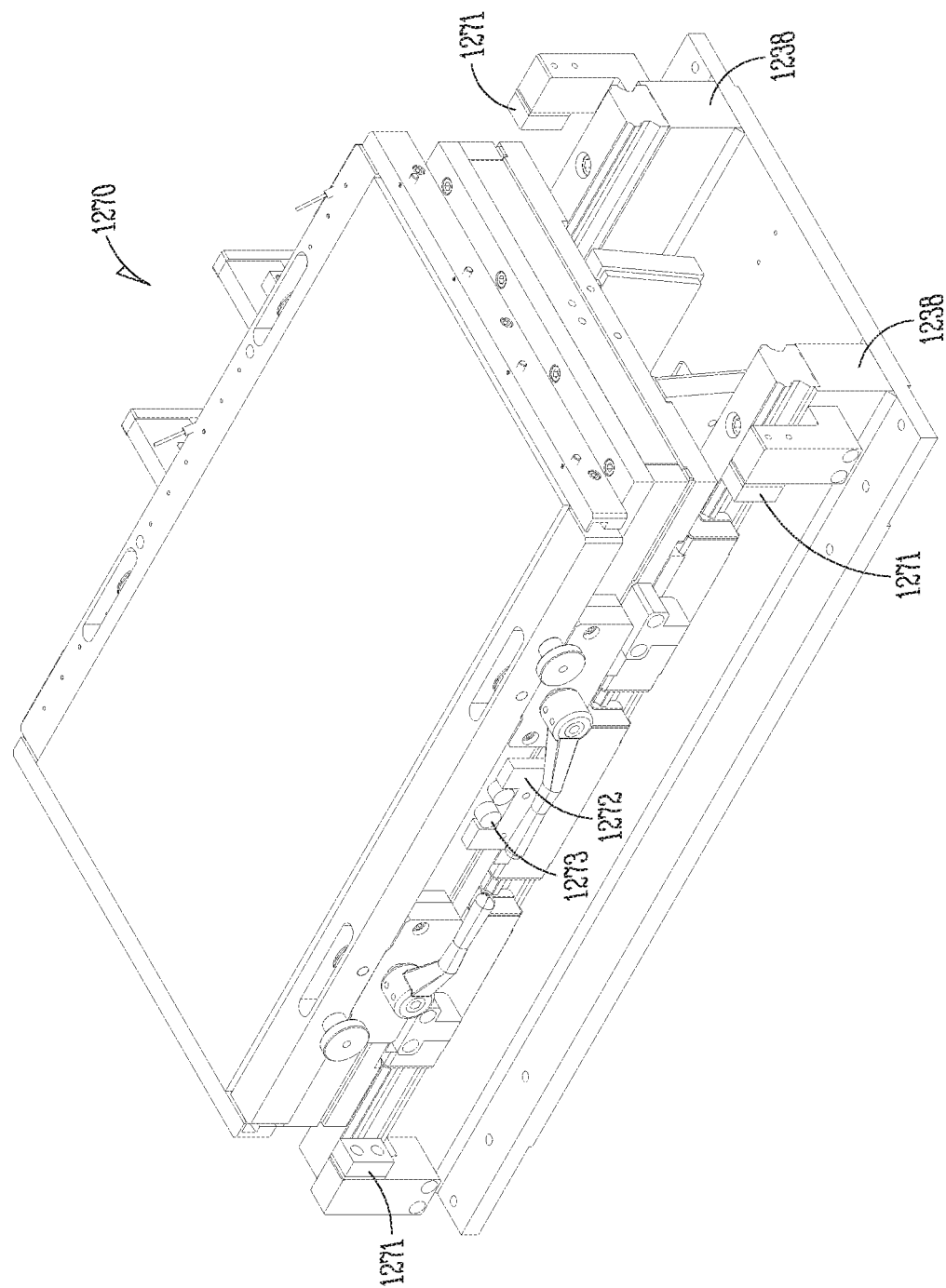
FIGS. 12A-12C illustrates perspective views of a plate assembly embodiment with at least one air cylinder.
Figure 12B:
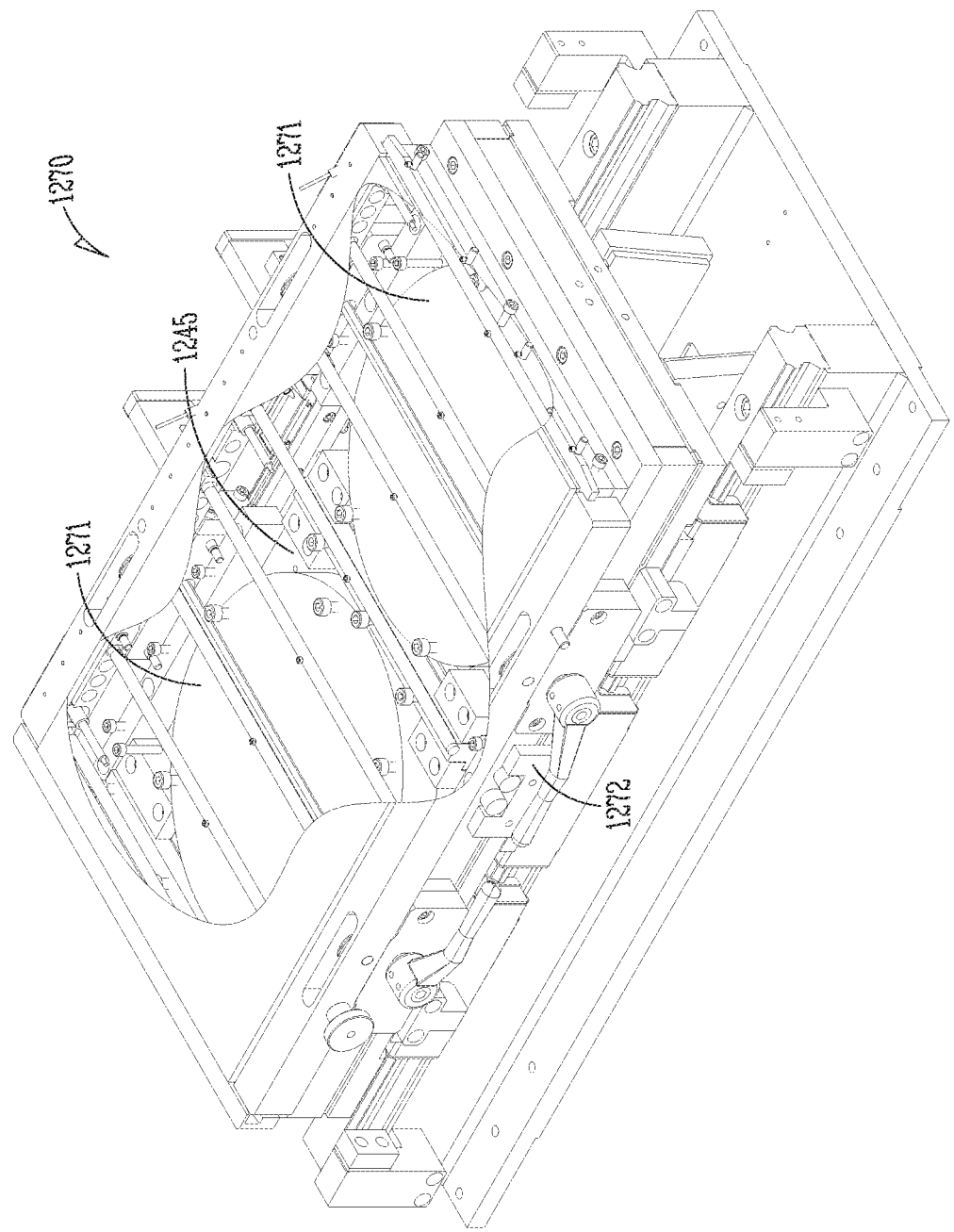
Figure 12C:
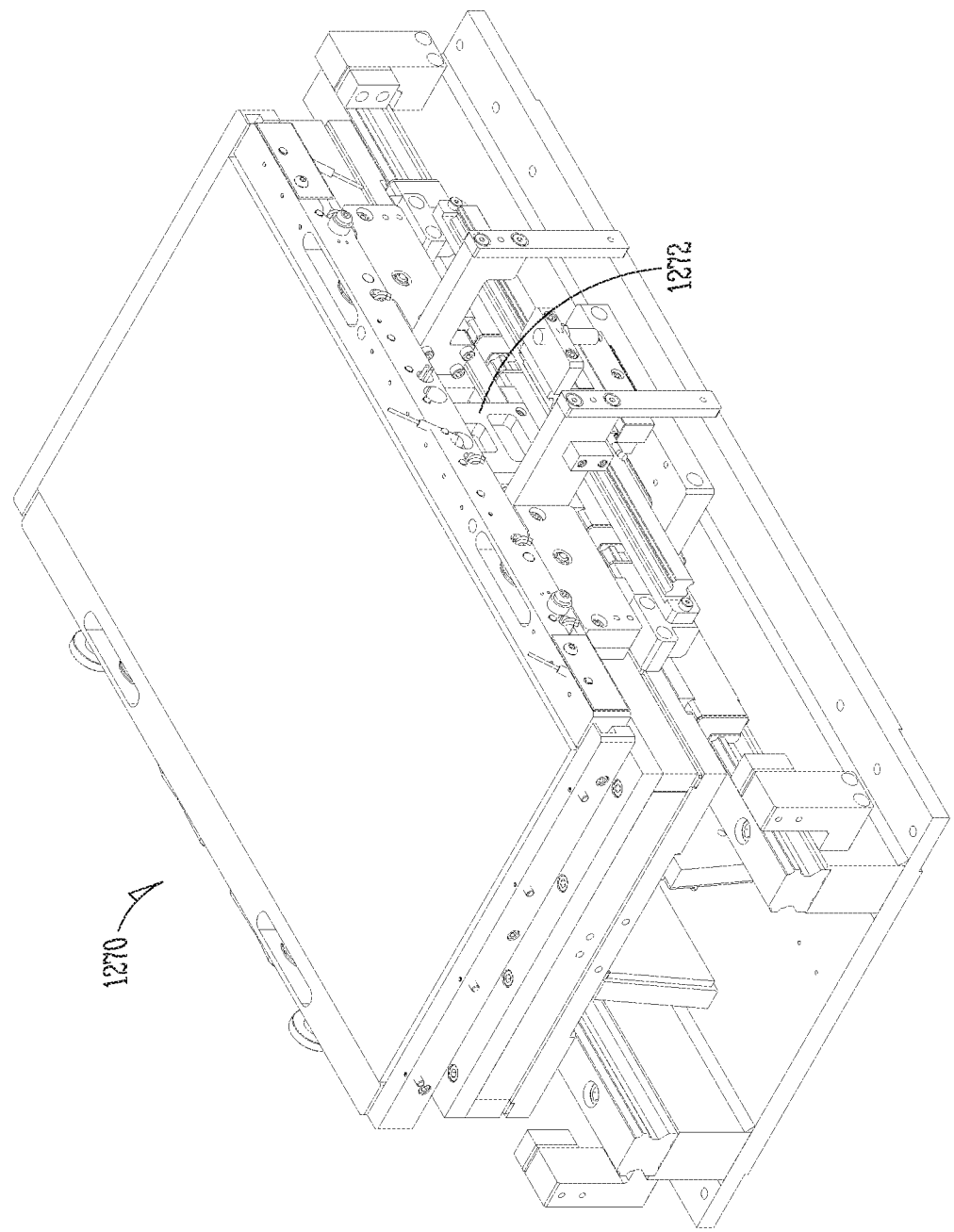

FIGS. 12A-12C illustrates perspective views of a plate assembly embodiment with at least one air cylinder. For example the embodiment of the plate assembly 1270 illustrated in FIGS. 12A-12C may replace the seal plate assembly illustrated in FIGS. 8A-8B. Rather than using an air bladder 847 as illustrated in FIG. 8B, the embodiment illustrated in FIGS. 12A-12C uses at least one air cylinder 1271 (see FIG. 12B). The remainder of the plate assembly embodiment, not illustrated in FIGS. 12A-12C, may be similar to the components of the embodiment shown in FIGS. 8A-8C.

The embodiment of plate assembly 1270 illustrated in FIGS. 12A-12C includes horizontal motion hard stops 1271 mounted to the base 1238. These hard stops 1271 function to limit the horizontal motion of the plate assembly 1270 on the base 1238. Encoders, such as optical or magnetic encoders, may be used to detect the position of the plate assembly 1270 on the base 1238. The illustrated plate assembly 1270 also includes cams 1272 and cam followers 1273 that cooperate with each other to promote a stable alignment of components that make the plate assembly 1270.

FIG. 12B illustrates two air cylinders positioned on the magnet mount 1245. In the illustrated embodiment, both air cylinders have an equal diameter and are symmetrically positioned on the magnet mount 1245. For example, the magnet mount 1245 may have a width and length where the length is about twice the width. The diameters of the air cylinders are slightly less than the width of the magnet mount. In some embodiments, the air cylinder(s) have a short stroke length less than 0.2 inches. For example, the air cylinder(s) may have a stroke length within a range of about ⅛ inch to about ⅙ inch.

FIG. 13 illustrates a perspective view of the plate assembly embodiment without a back plate. The figure illustrates air cylinders 1371 on the magnet mount 1345. In the illustrated embodiment, the mount 1345 has a generally rectangular footprint with a periphery defined by parallel long sides and parallel short sides. Rails 1374 are positioned along the parallel long sides. The figure also illustrates air cylinder hard stops that include cooperating mount elements 1375 and back plate elements 1376. The mount elements 1375 are mounted to the magnet mount 1345. The back plate elements 1376 are mounted to a back plate. The mount and back plate elements 1375 and 1376 have complementary stepped surface to contact each other to limit a separating motion between the mount 1345 and the back plate. In the illustrated embodiment, the hard stops include three parallel back plate elements 1376, where a first one of back plate elements is positioned along one of the short sides, a second one of the back plate elements is positioned along the other one of the short sides, and a third one of the back plate elements is centered between the first and second back plate elements. The mount elements 1347 of the hard stops cooperate with the back plate elements 1346 to limit the separating motion between the mount 1345 and the back plate. The hard stops and the peripheral rails define air cylinder areas on the mount 1345 in which the air cylinders are positioned. The figure also illustrates cams 1372, which were illustrated at 1272 in FIG. 12.

One of the cams may be formed from a structural element, and this structural element may have an opening through which pneumatic hoses 1377 may be passed to provide pressurized air to the air cylinders 1371. In the illustrated embodiment, this structural element is centered on a long side of the mount 1345. A break between rails 1374 provides room for the hoses 1377.

FIGS. 14A-14B illustrate a bottom and side view of an embodiment of an air cylinder. In some embodiments, the air cylinder(s) 1471 have a short stroke length less than 0.2 inches. For example, the air cylinder(s) may have a stroke length within a range of about ⅛ inch to about ⅙ inch. The illustrated air cylinders have a cylindrical shape with a circular foot print. The air cylinder fills substantially all of the space in the air cylinder areas on the mount defined by the rails 1374 and mount elements 1376, as illustrated in FIG. 13. In some embodiments, the air cylinders have a diameter of about 12 inches, a cylinder bore of about 10.5 inches and a height of about 1 to 2 inches. However, other sizes may be used for a particular design. The air cylinders can be mounted (e.g. bolted) to at least one of the mount or the back plate.

Figure 15:
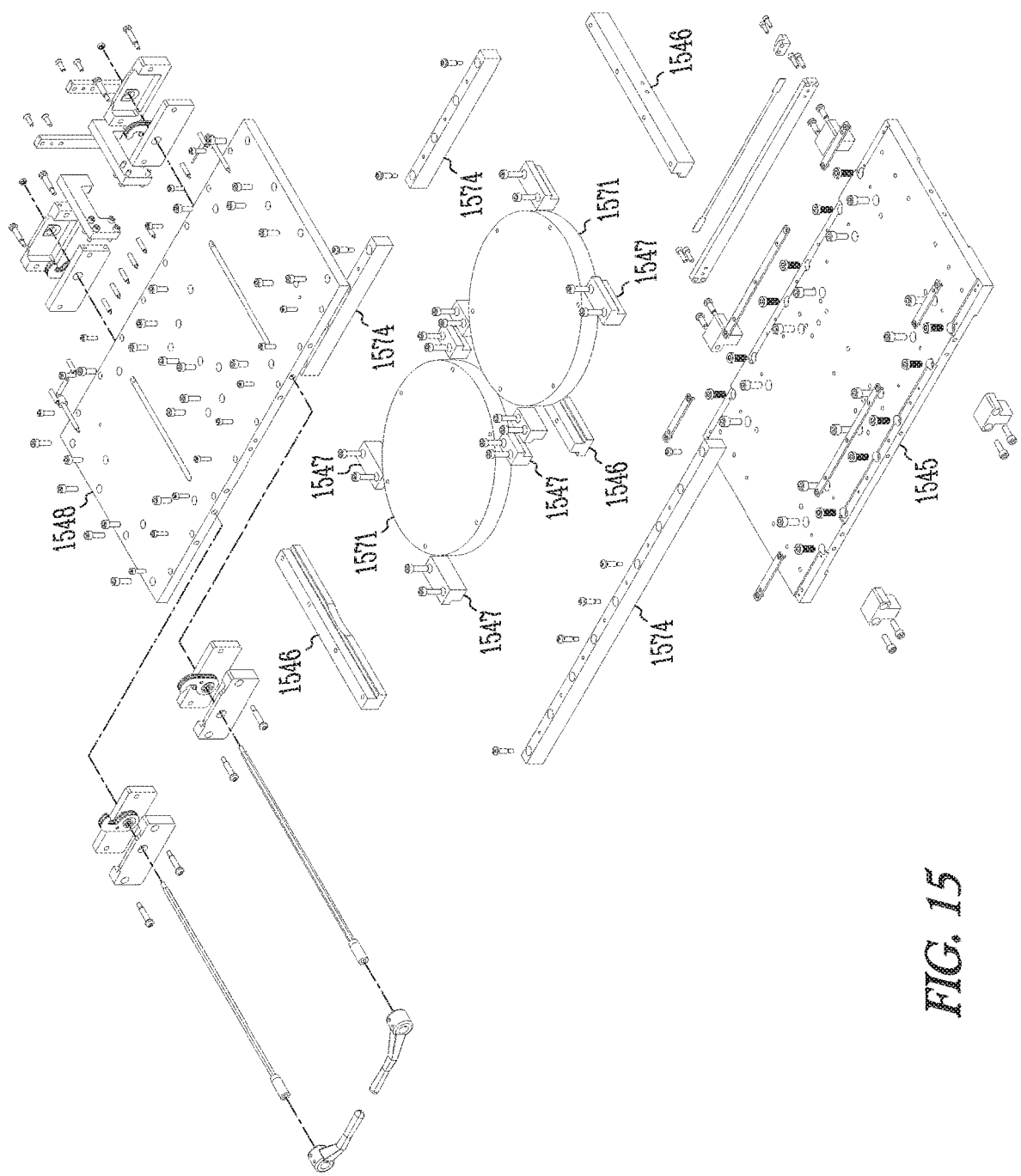
FIG. 15 illustrates an exploded view of the plate assembly embodiment with the at least on cylinder.

FIG. 15 illustrates an exploded view of the plate assembly embodiment with the at least on cylinder. The figure illustrates the mount 1545 and back plate 1548, which are similar to the mount 845 and back plate 848 illustrated in FIG. 8. FIG. 15 is intended to illustrate differences between the mount 1545 and 1548 back plate, which have been discussed above. FIG. 15 also illustrates the cooperating stepped surfaces of the mount elements 1547 and the back plate elements 1546.

One of ordinary skill in the art will understand that, the modules and other circuitry shown and described herein can be implemented using software, hardware, and combinations of software and hardware. As such, the illustrated modules and circuitry are intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined.

In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions contained on a computer-accessible medium capable of directing a processor to perform the respective method. In various embodiments, the medium is a magnetic medium, an electronic medium, or an optical medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed is:

1. A method for forming sealed pouches from a linearly moving web using a plurality of seal cycles occurring while the web is continuously moving, where each of the sealed pouches includes corresponding sealed margins around product to contain and seal the product therein, the method comprising:

moving the web along a linear web path passing between a first seal plate having a seal area and a second seal plate, wherein the seal area has a size for simultaneously forming all of the corresponding sealed margins for creating a set of at least one of the sealed pouches during each of the plurality of seal cycles, wherein the first and second seal plates are on opposing sides of the linearly moving web, wherein the seal area has a length in line with the web and a width extending across at least a majority of a width of the web, and wherein the length of the seal area is longer than the width of the sealed web;

implementing a motion profile for providing the first seal plate and the second seal plate with reciprocating motion while the linearly moving web is continuously moving along the linear web path, the reciprocating motion being used to perform a sealing operation on the linearly moving web during each of the plurality of seal cycles to create the set of at least one of the sealed pouches, the reciprocating motion including a linear forward plate motion while the linearly moving web is continuously moving along the linear web path and a backward plate motion while the linearly moving web is continuously moving along the linear web path, the motion profile including, for each of the first and second seal plates, a first vector component substantially parallel with the linear web path to provide the linear forward plate motion substantially parallel with the linear web path at a velocity substantially equal to a velocity of the web, and a second vector component substantially perpendicular with the linear web path into contact with the web for the sealing operation while the web moves along the linear web path, wherein a linear rail aligned substantially parallel with the linear web path is used to guide the linear forward plate motion and the backward plate motion, wherein implementing the motion profile includes applying a first force guided using the linear rail to provide the first vector component and applying a second force to provide the second vector component, wherein the first and second seal plates are maintained substantially parallel to each other and to the linear web path when the first and second seal plates are moved into contact with the web; and simultaneously forming all of the sealed margins corresponding to the set of at least one of the sealed pouches to seal product therein during each of the plurality of seal cycles by applying a desired pressure between the first and second seal plates at the seal area throughout the sealing operation when the substantially parallel first and second seal plates are in contact with the web.

2. The method of claim 1, further comprising heating the first seal plate and the second seal plate to a desired seal temperature before the first and second seal plates are moved into contact with the web.

3. The method of claim 1, further comprising programming a desired seal time and a desired seal pressure for the sealing operation, wherein implementing the motion profile includes moving the first and second seal plates into contact with each other for the desired seal time and at the desired seal pressure.

4. The method of claim 1, wherein applying the second force to provide the second vector component substantially perpendicular to the web provides plate motion along another linear rail that is perpendicular to the linear web path.

5. The method of claim 1, wherein at least one of the first seal plate or the second plate includes a tooling plate frame with a side opening, the method further comprising loading a tooling plate through the side opening into the tooling plate frame and securing the tooling plate with respect to the tooling plate frame for the sealing operation.

6. The method of claim 5, wherein loading the tooling plate through the side opening includes using spring-loaded pins at an end of the tooling plate frame opposite the side opening to assist with loading the tooling plate, and using threaded bolts to adjust the tooling plate against the spring-loaded pins.

7. The method of claim 1, further comprising programming a desired seal time, a desired seal pressure and a desired seal temperature for the sealing operation.

8. The method of claim 7, wherein applying the first force includes using a linear servo motor to provide plate motion substantially parallel with the linear web path at the velocity substantially equal to the velocity of the web.

9. The method of claim 7, wherein applying the second force provides plate motion along another linear rail that is perpendicular to the linear web path.

10. The method of claim 1, wherein the linear rail includes a linear bearing rail, and implementing the motion profile includes using a linear bearing and the linear bearing rail to guide both the linear forward plate motion and the backward plate motion.

11. The method of claim 10, further comprising heating the first seal plate and the second seal plate to a desired seal temperature, and the first and second seal plates are moved into contact with the web when at the desired seal temperature.

12. The method of claim 10, wherein applying the first force includes using a linear servo motor to provide plate motion substantially parallel with the linear web path at the velocity substantially equal to the velocity of the web, and applying the second force provides plate motion along another linear rail that is perpendicular to the linear web path.

13. The method of claim 1, wherein the first force is applied before the first and second seal plates contact the web.

14. The method of claim 1, wherein a desired fluid pressure is used to apply the desired pressure between the first and second seal plates and at the seal area to simultaneously form all of the sealed margins.

15. The method of claim 14, wherein the desired fluid pressure includes a desired air pressure used to apply the desired pressure between the first and second seal plates and at the seal area to simultaneously form all of the sealed margins.

16. The method of claim 15, further comprising using at least one air bladder or at least one air cylinder to apply the desired pressure between the first and second seal plates and at the seal area to simultaneously form all of the sealed margins.

17. The method of claim 14, wherein the desired fluid pressure is a programmable pressure.

18. The method of claim 1, wherein a desired air pressure is used to apply the desired pressure between the first and second seal plates and at the seal area to simultaneously form all of the sealed margins.

19. The method of claim 18, further comprising using at least one air bladder to apply the desired pressure at the seal area to simultaneously form all of the sealed margins.

20. The method of claim 18, further comprising using at least one air cylinder to apply the desired pressure between the first and second seal plates and at the seal area to simultaneously form all of the sealed margins.

* * * * *